(12) United States Patent
Schad et al.

(10) Patent No.: US 10,124,522 B2
(45) Date of Patent: Nov. 13, 2018

(54) POST-MOLD RETAINING APPARATUS AND METHOD

(71) Applicant: Athena Automation Ltd., Vaughan (CA)

(72) Inventors: Robert D. Schad, Toronto (CA); Roberto D. Sicilia, Mississauga (CA)

(73) Assignee: ATHENA AUTOMATION LTD., Vaughan (CA)

( * ) Notice: Subject to any disclaimer, the term of this patent is extended or adjusted under 35 U.S.C. 154(b) by 69 days.

(21) Appl. No.: 15/493,654

(22) Filed: Apr. 21, 2017

(65) Prior Publication Data

US 2017/0274570 A1   Sep. 28, 2017

Related U.S. Application Data

(63) Continuation of application No. PCT/CA2015/051064, filed on Oct. 21, 2015.

(60) Provisional application No. 62/066,712, filed on Oct. 21, 2014.

(51) Int. Cl.
| | |
|---|---|
| *B29C 45/42* | (2006.01) |
| *B29C 45/17* | (2006.01) |
| *B29C 45/72* | (2006.01) |
| *B29B 11/08* | (2006.01) |

(Continued)

(52) U.S. Cl.
CPC .......... *B29C 45/1769* (2013.01); *B29B 11/08* (2013.01); *B29C 45/4225* (2013.01); *B29C 45/7207* (2013.01); *B29C 2045/7214* (2013.01); *B29K 2105/258* (2013.01); *B29L 2031/712* (2013.01)

(58) Field of Classification Search
CPC .... B29C 2045/4241; B29C 2045/7214; B29C 45/4225; B29C 45/7207; B29C 45/7257
See application file for complete search history.

(56) References Cited

U.S. PATENT DOCUMENTS

| | | | |
|---|---|---|---|
| 4,836,767 | A | 6/1989 | Schad |
| 6,171,541 | B1 | 1/2001 | Neter |
| 6,299,431 | B1 | 10/2001 | Neter |

(Continued)

FOREIGN PATENT DOCUMENTS

| | | |
|---|---|---|
| EP | 1515829 | 8/2008 |
| WO | 2004041510 | 5/2004 |
| WO | 2008083460 | 7/2008 |

*Primary Examiner* — Jill L Heitbrink
(74) *Attorney, Agent, or Firm* — Bereskin & Parr LLP/S.E.N.C.R.L., S.R.L.

(57) ABSTRACT

A retaining pin for handling injection molded preforms includes a body including an internal body flow channel, and a plunger coupled to the body and movable relative to the body between advanced and retracted positions. The plunger includes an internal plunger flow channel. The plunger further includes a plunger abutment surface directed away from the body. The plunger is biased toward the advanced position and movable to the retracted position by engagement of the plunger abutment surface with an inner surface of a closed end of a preform when the preform and retaining pin are moved toward each other. The body flow channel and the plunger flow channel are in fluid communication when the plunger is in the retracted position. Fluid communication between the plunger flow channel and the body flow channel is inhibited when the plunger is in the advanced position.

32 Claims, 17 Drawing Sheets

(51) Int. Cl.
*B29K 105/00* (2006.01)
*B29L 31/00* (2006.01)

(56) References Cited

U.S. PATENT DOCUMENTS

| | | |
|---|---|---|
| 6,391,244 B1 | 5/2002 | Chen |
| 7,591,975 B2 * | 9/2009 | Kintzinger .......... B29C 45/4225 264/538 |
| 2010/0001439 A1 | 1/2010 | Bock |
| 2011/0305789 A1 | 12/2011 | Neter |
| 2013/0099420 A1 * | 4/2013 | Ha ...................... B29C 45/4225 264/328.1 |

* cited by examiner

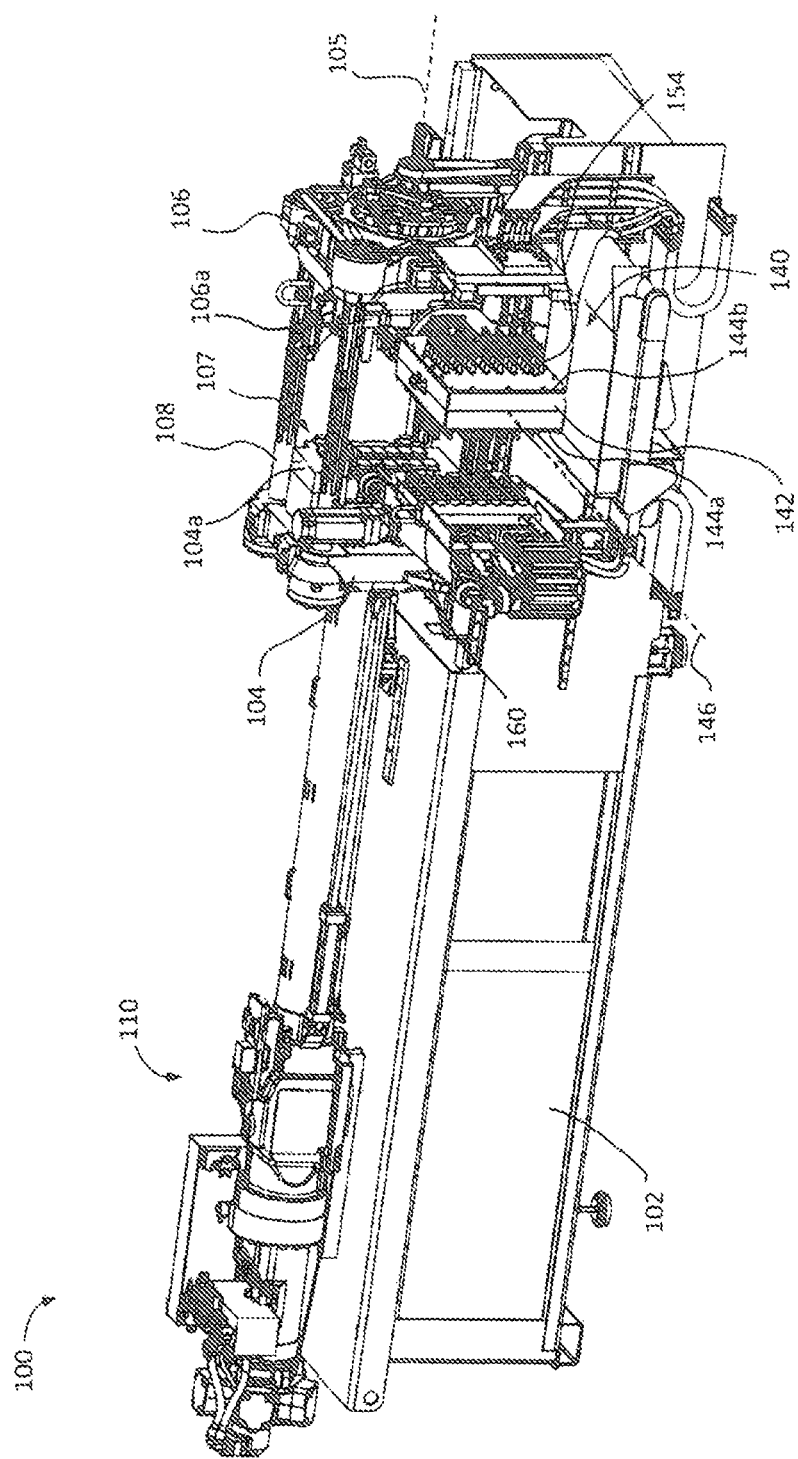

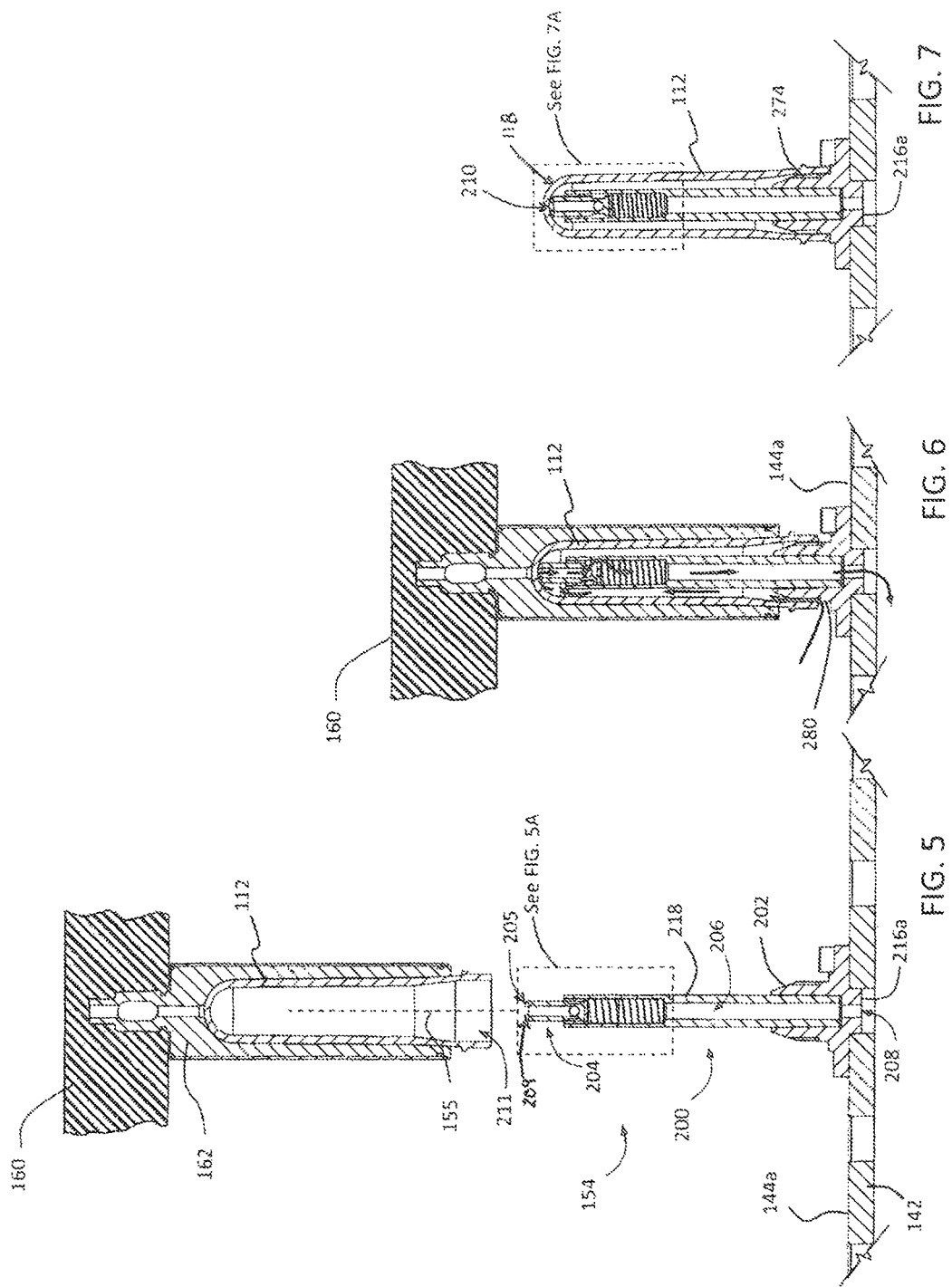

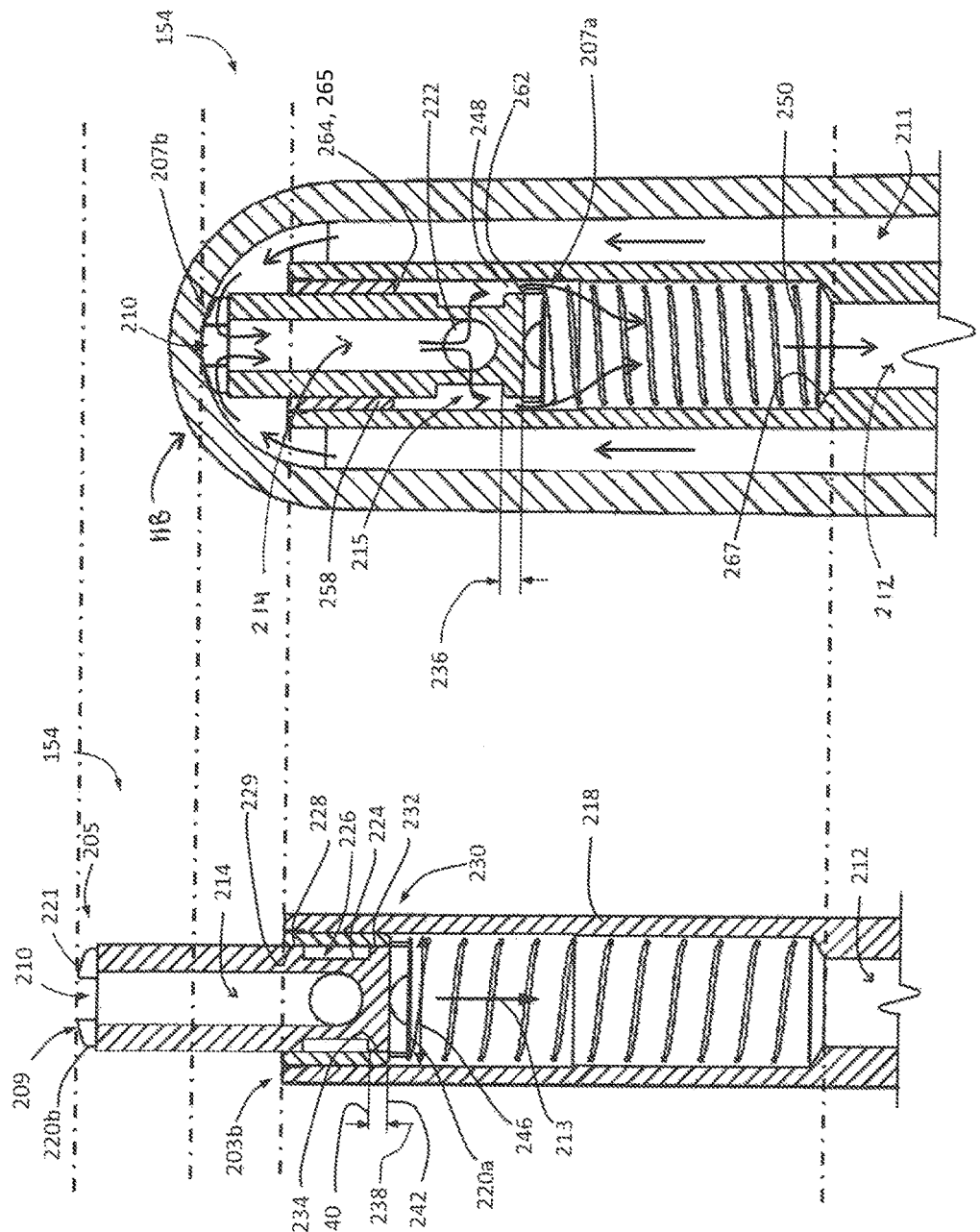

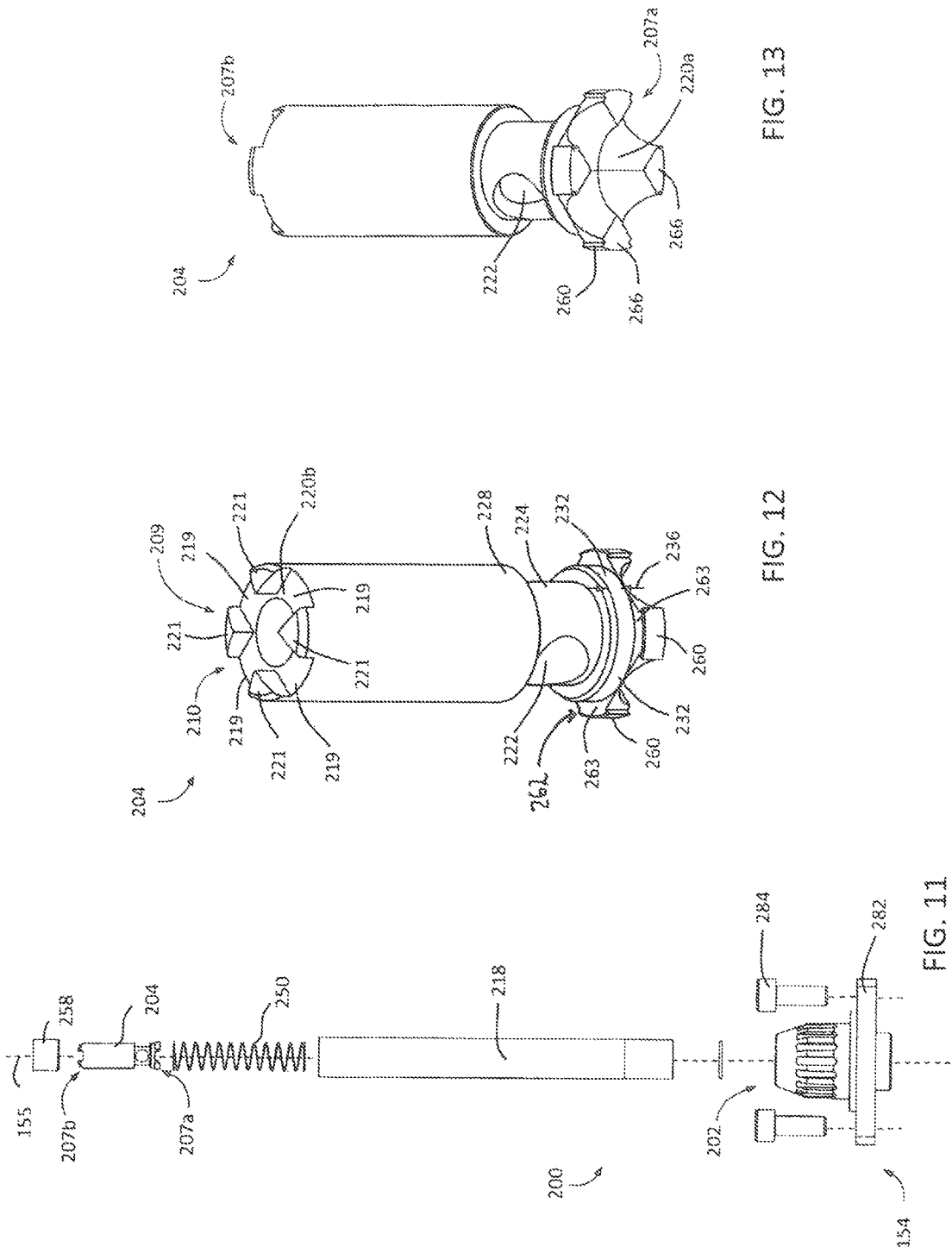

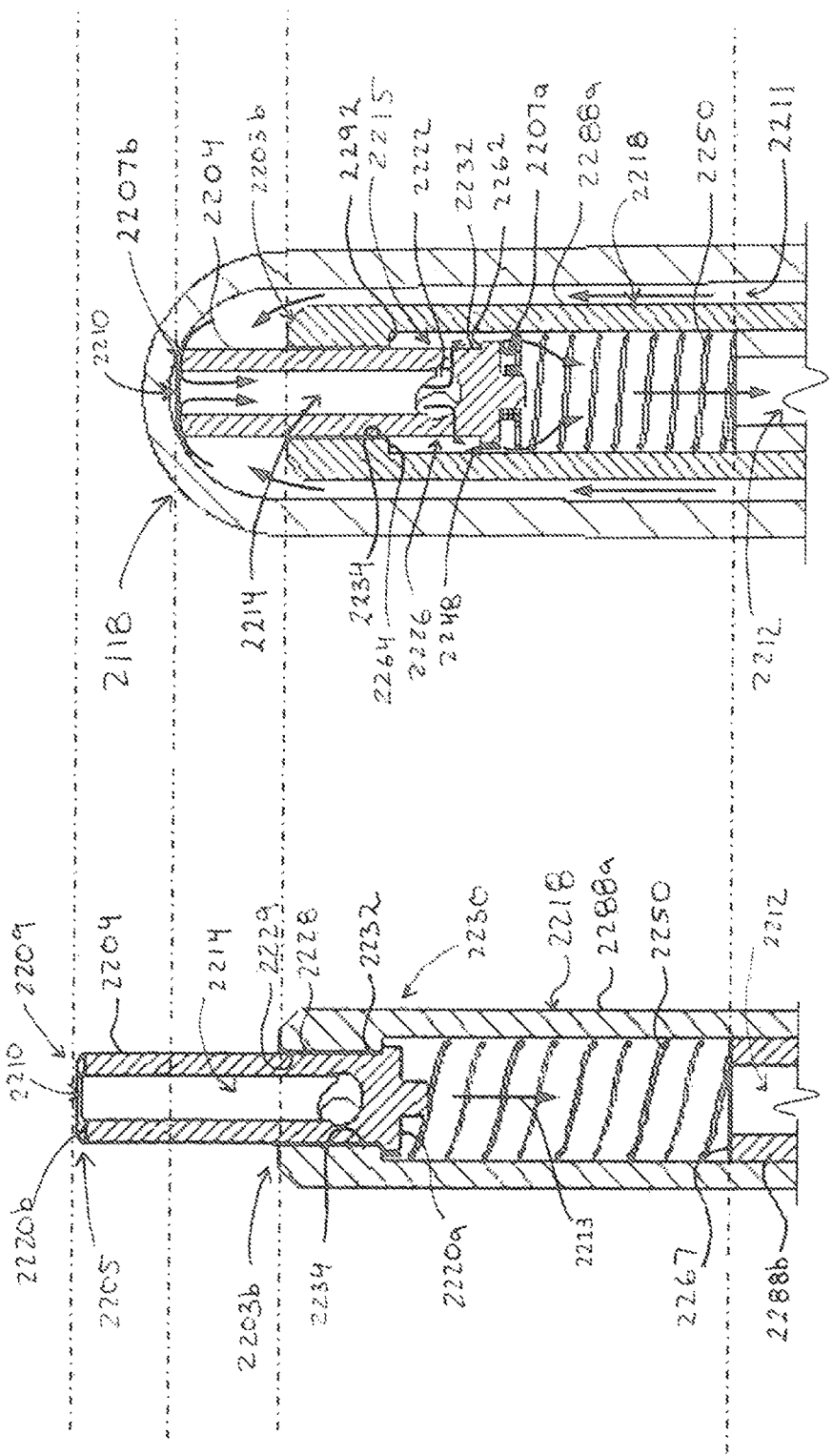

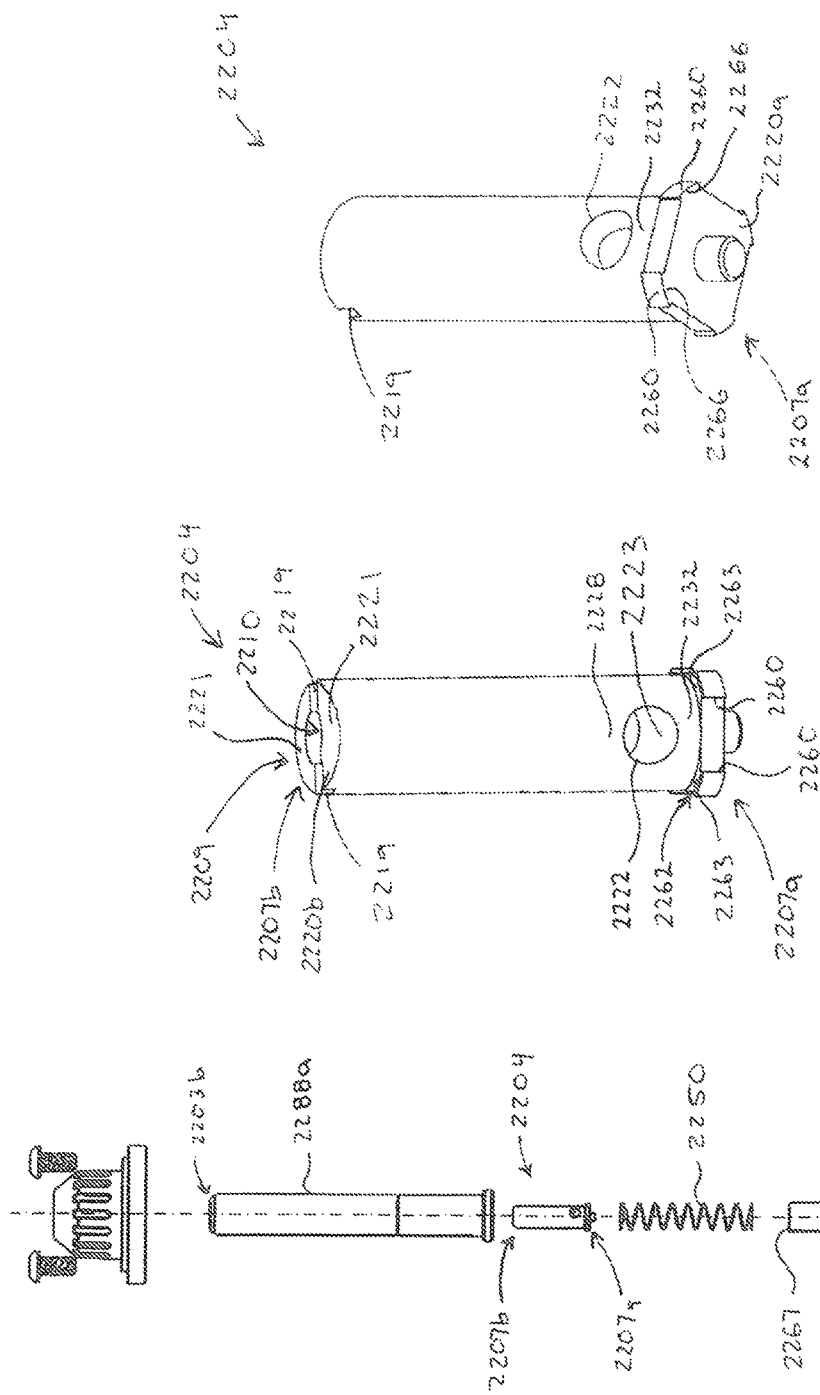

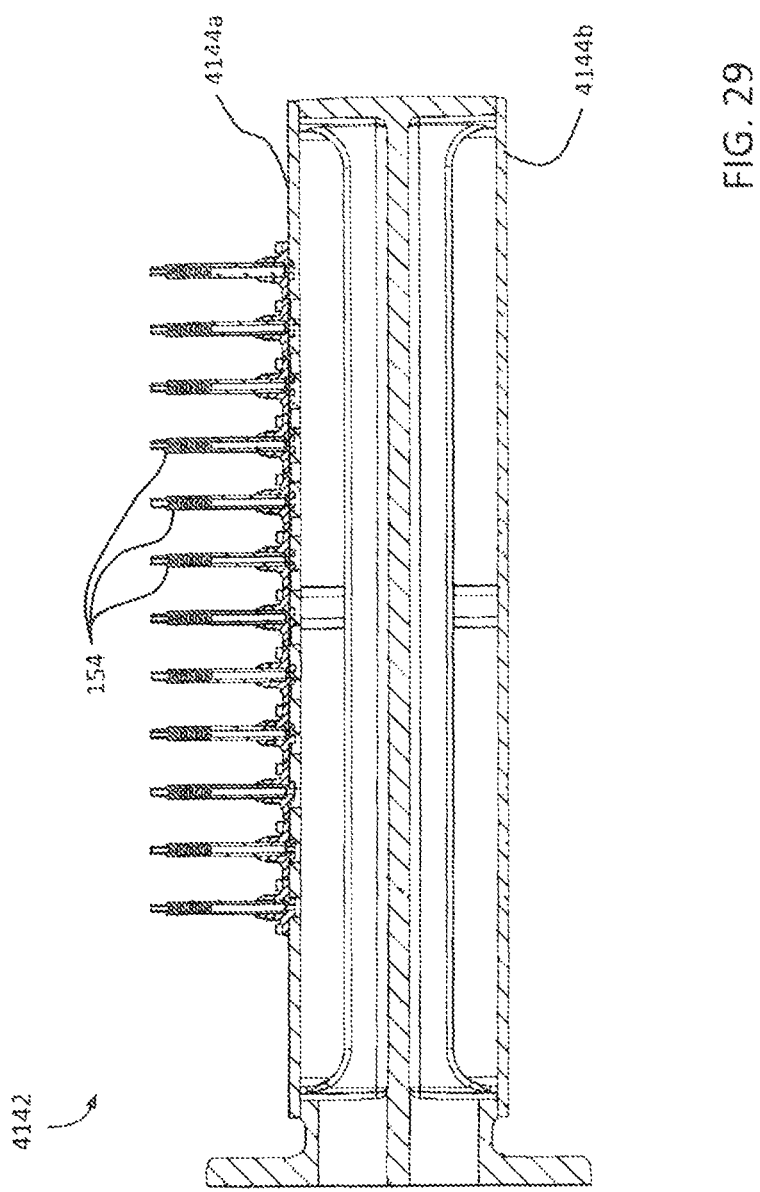

POST-MOLD RETAINING APPARATUS AND METHOD

CROSS-REFERENCE TO RELATED APPLICATIONS

This application claims the benefit of U.S. Provisional Application No. 62/066,712, entitled "POST-MOLD COOLING APPARATUS AND METHOD", filed Oct. 21, 2014. The entire contents of U.S. Provisional Application No. 62/066,712 are hereby incorporated by reference.

FIELD

The disclosure relates to injection molding machines, and methods and apparatuses for post-mold handling of injection molded articles.

BACKGROUND

U.S. Pat. No. 4,836,767 (Schad) relates to an apparatus for producing molded plastic articles which is capable of simultaneously producing and cooling the plastic articles. The apparatus has a stationary mold half having at least one cavity, at least two mating mold portions, each having at least one core element, mounted to a movable carrier plate which aligns a first one of the mating mold portions with the stationary mold half and positions a second of the mating mold portions in a cooling position, a device for cooling the molded plastic article(s) when in the cooling position, and a device for moving the carrier plate along a first axis so that the aligned mold portion abuts the stationary mold half and the second mating mold portion simultaneously brings each plastic article(s) thereon into contact with the cooling device. The carrier plate is also rotatable about an axis parallel to the first axis to permit different ones of the mating mold portions to assume the aligned position during different molding cycles.

U.S. Pat. No. 6,299,431 (Neter) discloses a rotary cooling station to be used in conjunction with a high output injection molding machine and a robot having a take-out plate. A high speed robot transfers warm preforms onto a separate rotary cooling station where they are retained and internally cooled by specialized cores. The preforms may also be simultaneously cooled from the outside to speed up the cooling rate and thus avoid the formation of crystallinity zones. Solutions for the retention and ejection of the cooled preforms are described. The rotary cooling station of the present invention may be used to cool molded articles made of a single material or multiple materials.

U.S. Pat. No. 6,391,244 (Chen) discloses a take-out device for use with a machine for injection molding plastic articles such as PET preforms. The take-out device has a plurality of cooling tubes that receive hot preforms from the molding machine, carry them to a position remote from the molds of the machine for cooling, and then eject the cooled preforms onto a conveyor or other handling apparatus. The preforms are retained within the cooling tubes by vacuum pressure, but are then ejected by positive air pressure. A retaining plate spaced slightly outwardly beyond the outer ends of the cooling tubes is shiftable into a closed position in which it momentarily blocks ejection of the preforms during the application positive air pressure, yet allows them to be dislodged slightly axially outwardly from the tubes. Such slight dislodging movement is inadequate to vent the air system to atmosphere such that sufficient dislodging air pressure remains in tubes where the preforms might otherwise tend to stick and resist ejection. After the momentary delay, the plate is shifted to an open position in which all of the dislodged preforms are freed to be pushed out of the tubes by the air pressure. Preferably, the retaining plate is provided with specially shaped holes having pass-through portions that become aligned with the tubes when the plate is in its open position, and smaller diameter blocking portions that become aligned with the tubes when the plate is in its closed position. The smaller diameter blocking portions exceed the diameter of the neck of the preforms but are smaller in diameter than the flanges of the preforms such that surface areas around the blocking portions overlie the flanges to block ejection of the preforms as they undergo their dislodging movement.

EP Pat. No. 1515829 (Unterlander) relates to a method and apparatus for cooling molded plastic articles after molding is finished. In particular, the disclosed invention relates to method and apparatus for a post mold cooling ("PMC") device having at least two opposed faces. The method and apparatus are, according to the inventors, particularly well suited for cooling injection molded thermoplastic polyester polymer materials such as polyethylene terephthalate ("PET") preforms.

U.S. Pat. No. 7,591,975 (Kintzinger et al.) discloses a molded article picker for a post-mold device and a related method for the use of the molded article picker for handling a molded article. The molded article picker includes a floating element being configured to be movable between an extended position and a retracted position and biased in the extended position. Furthermore, the molded article picker comprises a pressure structure extending through the floating element. The floating element is cooperable with the molded article to define a substantially enclosed volume including the pressure structure. The pressure structure is configured such that by evacuating the substantially enclosed volume the molded article is sealed to the floating element and the floating element is drawn into the retracted position, thereby transferring the molded article to the molded article picker.

SUMMARY

This summary is intended to introduce the reader to the more detailed description that follows and not to limit or define any claimed or as yet unclaimed invention. One or more inventions may reside in any combination or sub-combination of the elements or process steps disclosed in any part of this document including its claims and figures.

According to some aspects of the teachings disclosed herein, a retaining pin for handling preforms molded in an injection molding machine is disclosed. The preforms include a preform open end and a preform closed end opposite the preform open end. The retaining pin extends along a pin axis and includes: (a) a body; (b) a plunger movably coupled to the body, the plunger biased toward an advanced position and movable to a retracted position by engagement of a plunger abutment surface fixed to the plunger with a preform inner surface of the preform closed end when the preform and retaining pin are moved toward each other; and (c) an internal flow channel extending through the pin between a proximal opening in the body and a distal opening in the plunger. The proximal opening is for fluid communication with a suction source. The internal flow channel includes a body flow channel in the body and a plunger flow channel in the plunger. The body flow channel extends from the proximal opening and the plunger flow channel extends from the distal opening. The body flow channel and the plunger flow channel are in fluid communication when the plunger is in the retracted position, and fluid communication between the body flow channel and the plunger flow channel is inhibited when the plunger is in the advanced position.

In some examples, the plunger includes an intermediate opening disposed in the plunger axially between the proximal and distal openings. The plunger flow channel extends between the distal opening and the intermediate opening. The intermediate opening and the body flow channel are in fluid communication when the plunger is in the retracted position, and fluid communication between the intermediate opening and the body flow channel is inhibited when the plunger is in the advanced position.

In some examples, the distal opening is adjacent the plunger abutment surface.

In some examples, the plunger includes a plunger first end coupled to the body and a plunger second end spaced apart from the plunger first end. The distal opening is adjacent the plunger second end and faces an inner surface of the preform when the plunger abutment surface is engaged by the preform closed end.

In some examples, the plunger abutment surface is adjacent the plunger second end.

In some examples, the pin further includes a plunger blocking surface fixed to the plunger and a complementary body blocking surface fixed to the body. When the plunger is in the advanced position the plunger blocking surface and the body blocking surface are in sealed slidable engagement and inhibit fluid communication between the plunger flow channel and the body flow channel, and when the plunger is in the retracted position, the body flow channel and the plunger flow channel are in fluid communication via a flow gap provided between the plunger blocking surface and an inner surface of the body flow channel.

In some examples, the internal flow channel further includes an intermediate flow channel. The intermediate flow channel provides fluid communication between the plunger flow channel and the body flow channel when the plunger is in the retracted position. The intermediate flow channel includes the flow gap.

In some examples, the flow gap is annular.

In some examples, the plunger translates from the advanced position to the retracted position in a direction parallel to the pin axis and toward the proximal opening, and fluid flows through the flow gap in the direction when the plunger is in the retracted position and fluid is evacuated from the preform through the internal flow channel.

In some examples, the plunger blocking surface is substantially parallel to the pin axis.

In some examples, the plunger includes a plunger first end coupled to the body and a plunger second end spaced apart from the plunger first end. The plunger blocking surface is adjacent the plunger first end and the distal opening is adjacent the plunger second end.

In some examples, the plunger includes a plunger retaining surface and the body includes a complementary body retaining surface. The plunger retaining surface is spaced apart from the body retaining surface when the plunger is in the retracted position, and the plunger retaining surface bears against the body retaining surface when the plunger is in the advanced position to inhibit movement of the plunger beyond the advanced position.

In some examples, the plunger retaining surface is separate from the plunger blocking surface.

In some examples, the plunger retaining surface is orthogonal to the plunger blocking surface.

In some examples, the pin further includes a biasing member biasing the plunger toward the advanced position.

In some examples, the biasing member is internal the body.

In some examples, the biasing member is disposed within the body flow channel.

In some examples, the preform has a neck region adjacent the preform open end and the body includes a base. The base includes a base journal having a base journal outer surface sized smaller than a neck region inner surface of the preform neck region to provide a generally annular base flowgate between the base journal outer surface and the neck region inner surface. The base flowgate forms a flow restriction when the plunger is in the retracted position and fluid is drawn into the preform through the base flowgate and evacuated from the preform through the internal flow channel.

In some examples, the base journal outer surface includes at least one notch to increase fluid flow capacity of the base flowgate.

In some examples, the body includes an elongate conduit member coupled to the base. The base includes a proximal end of the body and the conduit member comprising a distal end of the body.

In some examples, the plunger translates between the advanced and retracted positions parallel to the pin axis.

In some examples, the plunger flow channel extends along a plunger channel axis that is parallel to the pin axis.

In some examples, the body flow channel extends along a body channel axis that is parallel to the pin axis.

In some examples, the plunger channel axis and the body channel axis are coaxial.

In some examples, the pin further includes a body bore extending through the body from the proximal opening to a body distal end of the body, and the plunger is at least partially received within the body bore when in the advanced and retracted positions.

In some examples, the body flow channel comprises a body flow channel portion of the body bore, the body flow channel portion extending from the proximal opening to the plunger.

According to some aspects of the teachings disclosed herein, a retaining pin for handling preforms molded in an injection molding machine is disclosed. The preforms have a preform open end and a preform closed end opposite the preform open end. The retaining pin includes: (a) a body including an internal body flow channel for fluid communication with a suction source; and (b) a plunger coupled to the body and movable relative to the body between an advanced position and a retracted position. The plunger includes an internal plunger flow channel for fluid communication with an interior space of the preform. The plunger further includes a plunger abutment surface directed away from the body. The plunger is biased toward the advanced position and movable to the retracted position by engagement of the plunger abutment surface with a preform inner surface of the preform closed end when the preform and retaining pin are moved toward each other. The body flow channel and the plunger flow channel are in fluid communication when the plunger is in the retracted position, and fluid communication between the plunger flow channel and the body flow channel is inhibited when the plunger is in the advanced position.

In some examples, the pin further includes a body bore extending through the body, and the plunger is at least partially received within the body bore when in the advanced and retracted positions.

In some examples, the body flow channel includes a body flow channel portion of the body bore. The body flow channel portion extends from a proximal opening in the body to the plunger. The proximal opening is for fluid communication with the suction source.

According to some aspects of the teachings disclosed herein, a method of retaining a preform on a transfer shell of an injection molding machine is disclosed. The preform has a preform open end and a preform closed end opposite the preform open end. The method includes: (a) drawing together the preform and a retaining pin mounted to the transfer shell to position a plunger of the pin in an interior space of the preform, and to retract the plunger relative to a body of the pin and open fluid communication between a proximal opening in the body and a distal opening in the plunger; and (b) evacuating fluid from the interior space of the preform through an internal flow channel extending between the proximal and distal openings to maintain a vacuum force on the preform and retain the preform on the pin.

In some examples, step (b) further includes drawing a flow of fluid into the interior space of the preform through a base flowgate between an outer surface of the body and a neck region inner surface of the preform, the flow of fluid convectively cooling the preform.

In some examples, step (a) further includes engaging a preform inner surface of the preform closed end with a plunger abutment surface of the plunger to retract the plunger relative to the body.

DRAWINGS

The drawings included herewith are for illustrating various examples of articles, methods, and apparatuses of the teaching of the present specification and are not intended to limit the scope of what is taught in any way.

In the drawings:

FIG. 1 is a perspective view of the non-operator side of an injection molding machine;

FIG. 5 is a cross-sectional view of a portion of the machine of FIG. 1, showing a portion of a take-out plate spaced apart from a portion of a transfer shell;

FIG. 5A is an enlarged view of a portion of FIG. 5;

FIG. 6 is the portion of the machine of FIG. 5, with the take-out plate in closer proximity to the transfer shell;

FIG. 7 is the portion of the machine of FIG. 5, with the take-out plate removed;

FIG. 7A is an enlarged view of a portion of FIG. 7;

FIG. 11 is an exploded view of the retaining pin of FIG. 8;

FIG. 12 is an upper perspective view of a plunger of the retaining pin of FIG. 8;

FIG. 13 is a lower perspective view of the plunger of FIG. 12;

FIG. 18A is an enlarged view of a portion of FIG. 18;

FIG. 19A is an enlarged view of a portion of FIG. 19;

FIG. 20 is an exploded view of the retaining pin of FIG. 17;

FIG. 21 is an upper perspective view of a plunger of the retaining pin of FIG. 17;

FIG. 22 is a lower perspective view of the plunger of FIG. 21;

FIG. 29 is a cross-sectional view, similar to FIG. 3, of an alternative example of a transfer shell for a machine like that of FIG. 1.

DETAILED DESCRIPTION

Figure 2B:
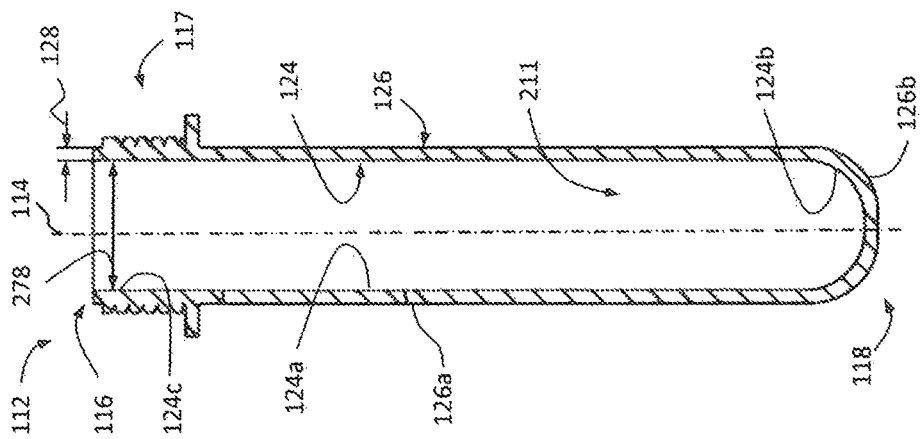
FIG. 2B is a cross-sectional view of the article of FIG. 2, taken along line 2B-2B of FIG. 2A.
Figure 2A:
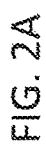
FIG. 2A is a top view of the article of FIG. 2.

Various apparatuses or processes will be described below to provide an example of an embodiment of each claimed invention. No embodiment described below limits any claimed invention and any claimed invention may cover processes or apparatuses that differ from those described below. The claimed inventions are not limited to apparatuses or processes having all of the features of any one apparatus or process described below or to features common to multiple or all of the apparatuses described below. It is possible that an apparatus or process described below is not an embodiment of any claimed invention. Any invention disclosed in an apparatus or process described below that is not claimed in this document may be the subject matter of another protective instrument, for example, a continuing patent application, and the applicants, inventors or owners do not intend to abandon, disclaim or dedicate to the public any such invention by its disclosure in this document.

Referring to FIG. 1, an example of an injection molding machine 100 includes a machine base 102, with a stationary platen 104 and a moving platen 106 mounted to the machine base 102 and coupled together via tie bars 108. The moving platen 106 can translate toward and away from the stationary platen 104 along a machine axis 105. A mold 107 is formed between the platens 104, 106, the mold 107 defined at least in part by a first mold half 104a mounted to the stationary platen 104, and a second mold half 106a mounted to the moving platen 106. An injection unit 110 is mounted to the machine base 102 for injecting resin or other mold material into the mold 107 to form a molded article.

In the example illustrated, the injection molding machine 100 is set up for molding preforms that can be used as input material for subsequent processing, for example, a blow molding operation to produce beverage containers. With reference to FIG. 2, an example preform 112 comprises a generally elongate tubular article extending along a preform axis 114. The preform 112 includes a preform open end 116 and a preform closed end 118 opposite the preform open end 116. The preform 112 has a preform neck region 117 adjacent the preform open end 116. In the example illustrated, the neck region 117 includes a threaded portion 120 for receiving a closure. A radially outwardly extending annular flange 122 may be adjacent the threaded portion 120, with the threaded portion 120 disposed axially between the preform open end 116 and the flange 122.

Figure 2:
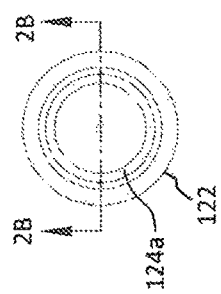
FIG. 2 is a side view of an article formed by the machine of FIG. 1.

Referring to FIG. 2B, in the example illustrated, the preforms 112 have an inner surface 124 that includes a generally cylindrical inner wall portion 124a along the axial extent of the preform 112 (between the preform open and closed ends 116, 118), and a generally concave inner end portion 124b at the preform closed end 118. The preforms 112 have an outer surface 126 spaced apart from the inner surface 124. The outer surface 126 can include a generally cylindrical outer wall portion 126a along the axial extent of the preform 112 and a convex outer end portion 126b at the preform closed end 118. The spacing between the inner and outer surfaces 124, 126 generally defines a preform wall thickness 128.

Referring to FIG. 1, in the example illustrated, the first mold half 104a includes recesses (or mold cavities) for forming the outer surface 126 of the preforms 112. The second mold half 106a includes mold core pins for insertion into the mold cavities and forming the inner surface 124 of the preforms 112. In the example illustrated, the machine 100 has an equal quantity of mold cavities and mold pins, this quantity defining the cavitation number of the mold 107. Typical mold cavitation numbers include 16, 32, 48, 96, or more.

The injection molding machine 100 is, in the example illustrated, provided with a part-handling apparatus 140 for moving and/or treating articles formed in the mold 107 of the machine. The part-handling apparatus 140 comprises a rotary transfer shell 142 having one or more shell sides 144. Each shell side 144 is rotatable together with the transfer shell 142 about a shell axis 146. In the example illustrated, the shell axis 146 is generally horizontal and perpendicular to the machine axis 105. The transfer shell 142 has, in the example illustrated, two generally planar shell sides 144a, 144b (first and second shell sides, respectively). The first and second shell sides 144a, 144b are arranged generally parallel to each other and on opposite sides of the shell axis 146.

Rotation of the transfer shell 142 about the shell axis 146 can move the shell sides 144a, 144b between various stations. In the example illustrated, the stations include a load station, an unload station, and at least one supplemental cooling station. The shell side in the load station can interact with a take-out plate 160 that removes molded articles from the mold.

Figure 3:
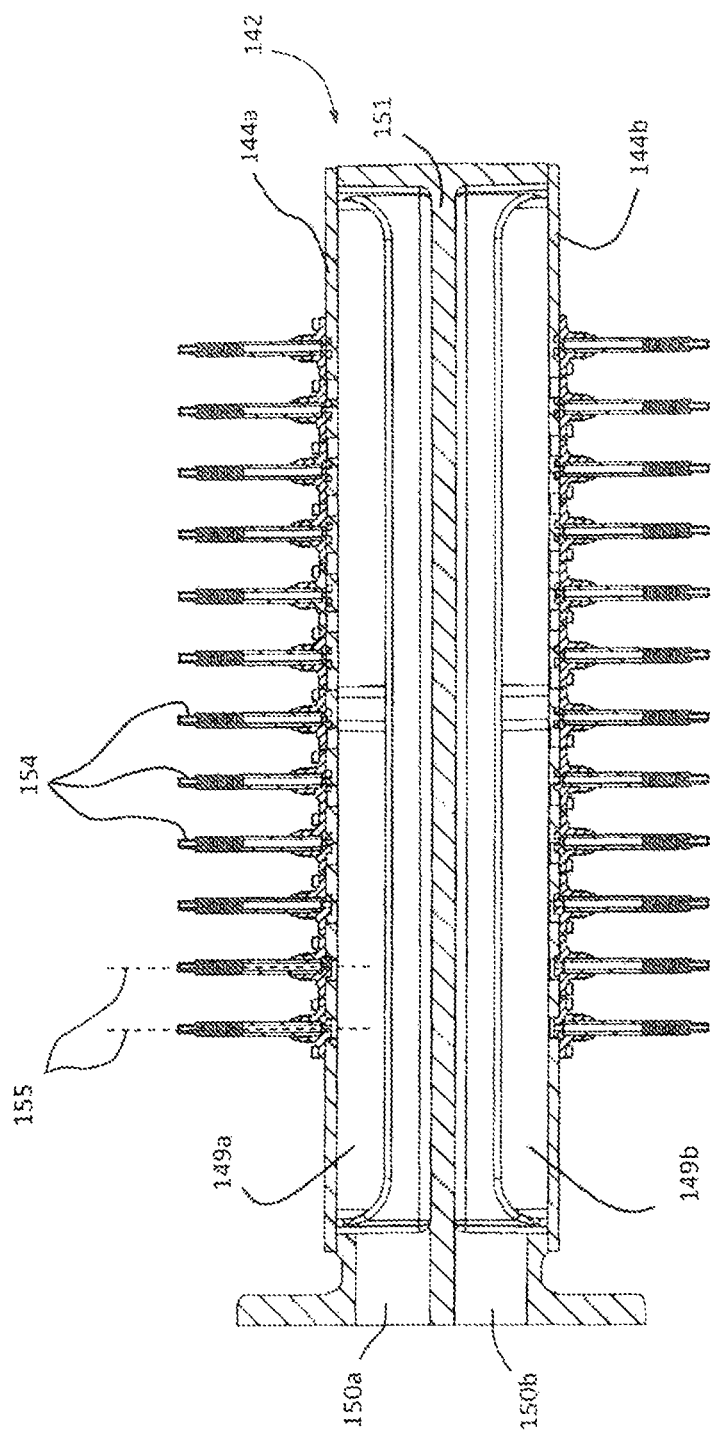
FIG. 3 is a cross-sectional view of a transfer shell of the machine of FIG. 1, taken in a plane parallel to a shell rotation axis of the machine of FIG. 1.
Figure 4:
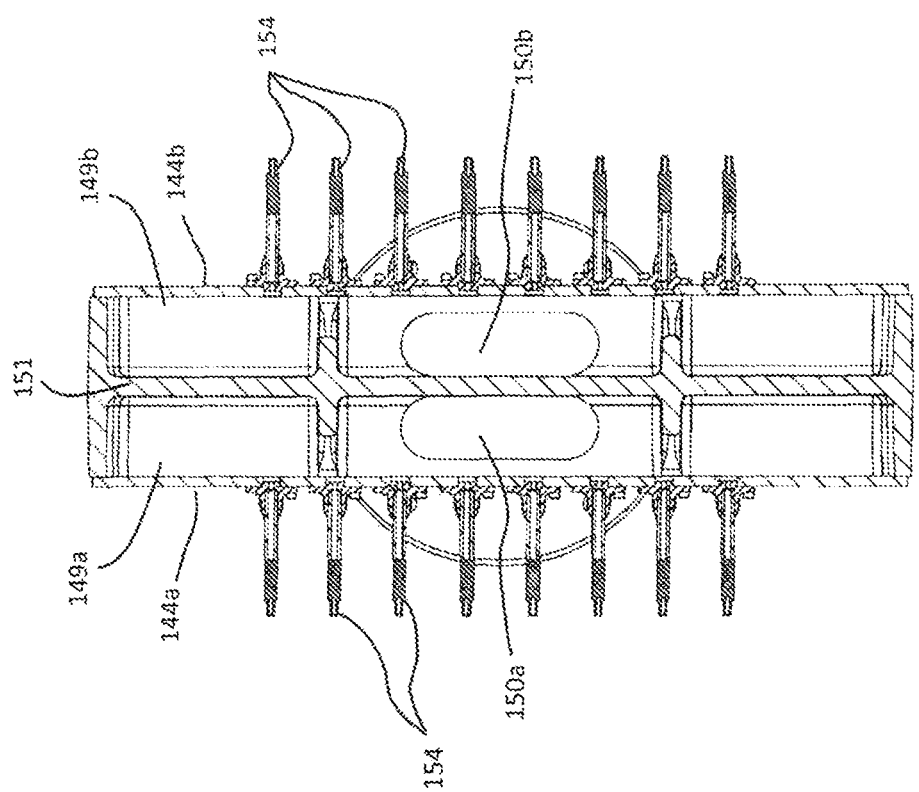
FIG. 4 is a cross-sectional view of the transfer shell of FIG. 3, taken in a plane parallel to a machine axis of the machine of FIG. 1.

With reference to FIGS. 3 and 4, in the example illustrated, the part-handling apparatus 140 further comprises a plurality of shell receivers in the form of retaining pins 154. Each pin 154 is configured to receive a respective preform 112 and to help retain the preform 112 on the transfer shell 142 as the shell indexes the shell sides 144a, 144b between stations. The transfer shell 142 can optionally provide cooling to the preforms 112 loaded on the transfer shell 142. For example, the pins 154 are, in the example illustrated, configured to provide cooling to interior surfaces of the preforms 112, and to retain preforms 112 on the pins 154 as the transfer shell 142 indexes the shell sides 144a, 144b among the various stations. In the example illustrated, the transfer shell 142 has pins 154 on the two shell sides 144a, 144b. Alternatively, pins 154 may be provided on only one side of the shell, or on more than two sides.

In the example illustrated, the transfer shell 142 includes a dividing wall 151 that separates the interior of the transfer shell 142 into two shell side chambers 149a, 149b. Each shell side chamber 149a, 149b can be in flow communication with the pins 154 mounted on the respective shell side 144a, 144b.

The part handling apparatus 140 may include a fluid pressurization device for urging a flow of fluid through the pins 154. The fluid pressurization device can be a blower in fluid communication with one or more of the shell side chambers 149a, 149b. In the example illustrated, the fluid pressurization device is an air blower that has an inlet for drawing air into the fluid pressurization device, and an outlet for expelling air from the fluid pressurization device, and provides a pressure differential between the inlet and the outlet. The fluid pressure at the outlet is greater than the fluid pressure at the inlet, and in the example illustrated, the fluid pressure at the outlet is greater than atmospheric pressure and the fluid pressure at the inlet is less than atmospheric pressure. The fluid pressurization device can positively pressurize or negatively pressurize a space by connection to the outlet or inlet, respectively. In the example illustrated, each shell side chamber 149a, 149b has a respective flow port 150a, 150b that can be alternatingly connected to the inlet or outlet of the air blower so that the shell side chambers 149a, 149b can be positively or negatively pressurized.

The pins 154 can be configured to retain the preforms 112 on the pins 154 using suction, for example by withdrawing fluid from an interior space 211 (FIG. 2B) of the preforms 112 via the pins 154. The interior space 211 of the preforms 112 need not be sealed from the external environment, and some fluid flow into the preform open end 116 can further help cool the preform 112.

In the example illustrated, the transfer shell 142 is configured so that rotation of the transfer shell 142 about the shell axis 146 can move the flow ports 150a, 150b into communication with the blower inlet and outlet as the shell sides 144a, 144b are indexed to different positions. Furthermore, in the example illustrated, the shell side chamber 149a is negatively pressurized, to create a vacuum suction on the pins 154 on the shell side 144a. When the shell side 144a is in the load station and interacting with the take-out plate 160, the pins 154 on the shell side 144a withdraw fluid from the interior space 211 of the preforms 112, via respective distal openings 210 of the pins 154. The apparatus can also be configured so that rotation of the shell side 144a to the unload station can cause the flow port 150a to be disconnected from the blower inlet, and optionally connected to the blower outlet, so that the vacuum force on the pins 154 on shell side 144*a* is reduced and/or replaced with a blowing force to help eject the preforms 112 from the transfer shell 142.

Figure 9:
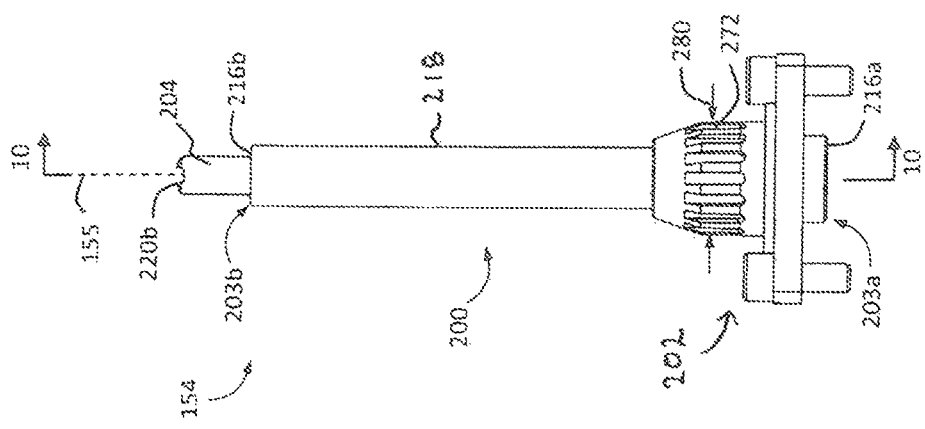
FIG. 9 is a side elevation view of the retaining pin of FIG. 8.

Referring to FIG. 5, in the example illustrated, each pin 154 extends along a pin axis 155 and includes a body 200. The body 200 is fixed to the shell side 144*a* in the example illustrated. Referring to FIG. 9, in the example illustrated, the body 200 extends between a body proximal end 203*a* and a body distal end 203*b* spaced apart from the body proximal end 203*a*. The body proximal end 203*a* is adjacent the shell side 144*a*, and the body distal end 203*b* is spaced away from the shell side 144*a*. The body 200 includes a base 202 for attachment to the shell side 144*a*. The base 202 includes the body proximal end 203*a*.

Each pin 154 further includes a plunger 204 movably coupled to the body 200. In the example illustrated, the plunger 204 is movable relative to the body 200 between an advanced position (FIG. 5A) and a retracted position (FIG. 7A). The plunger 204 is movable between the advanced and retracted position parallel to the pin axis 155. Referring to FIG. 5A, the plunger 204 translates from the advanced position to the retracted position in a direction 213 parallel to the pin axis and toward the proximal opening 208. In the example illustrated, the plunger 204 is biased toward the advanced position. The plunger 204 is biased toward the advanced position by a biasing member, which in the example illustrated, comprises a compression spring 250.

Figure 10:
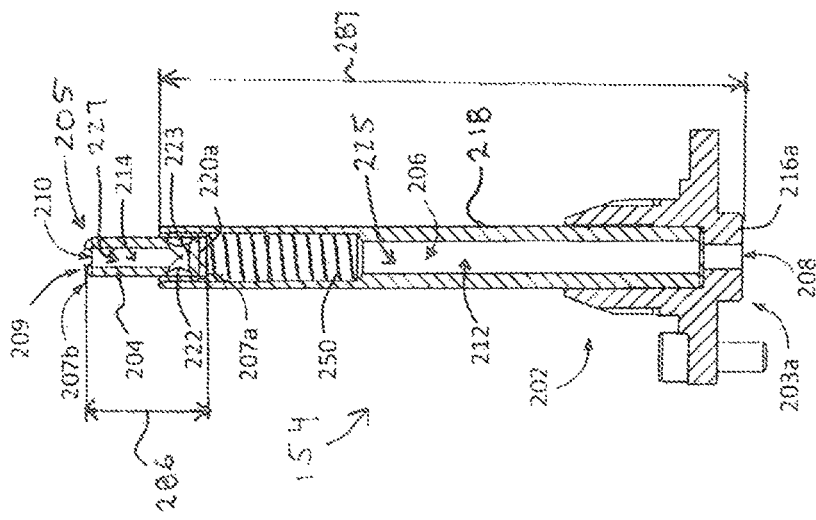
FIG. 10 is a cross-sectional view of the retaining pin of FIG. 8, taken along line 10-10 of FIG. 9.

Referring to FIG. 10, in the example illustrated, the plunger 204 includes a plunger first end 207*a* coupled to the body 200, and a plunger second end 207*b* spaced apart from the plunger first end 207*a* away from the body 200 (see also FIGS. 12 and 13). In the example illustrated, the plunger 204 includes a plunger abutment surface 209 fixed to the plunger 204. The plunger abutment surface 209 is directed away from the body 200, and in the example illustrated, is adjacent the plunger second end 207*b* and in facing relation to a preform inner surface of the preform closed end 118 when the preform 112 is retained on the pin 154 (see FIG. 7A). In the example illustrated, the plunger 204 provides a tip portion 205 of the pin 154. The tip portion 205 comprises the plunger abutment surface 209 in the example illustrated. In the example illustrated, the plunger 204 has a plunger axial extent 286 that is relatively shorter than a body axial extent 287 of the body 200. The plunger axial extent 286 is approximately one-quarter the length of the body axial extent 287 in the example illustrated.

Referring to FIGS. 5 to 7, the plunger 204 can be moved to the retracted position (FIG. 7) by relative movement of a preform 112 toward the pin 154. In the example illustrated, the plunger 204 is movable from the advanced position to the retracted position by engagement of the plunger abutment surface 209 with the preform inner surface of the preform closed end 118 when the preform 112 and the pin 154 are moved toward each other.

Referring to FIG. 10, in the example illustrated, each pin 154 includes an internal flow channel 206 extending through the pin 154 between a proximal opening 208 in the body 200, and a distal opening 210 in the plunger 204. The internal flow channel 206 includes a body flow channel 212 extending through the body 200, and a plunger flow channel 214 extending through the plunger 204. The plunger flow channel 214 extends from the distal opening 210. The plunger flow channel 214 extends along a plunger channel axis that is parallel to the pin axis 155. The body flow channel 212 extends from the proximal opening 208. The body flow channel 212 extends along a body channel axis that is parallel to the pin axis 155. The plunger channel axis and the body channel axis are coaxial in the example illustrated.

The proximal opening 208 is for fluid communication with a suction source. Referring to FIG. 5, in the example illustrated, the proximal opening 208 is in fluid communication with the inlet (suction side) of the blower (fluid pressurization device) via the shell side chamber 149*a*. In the example illustrated, the proximal opening 208 is disposed in a body lower endface 216*a* of the body 200 adjacent the body proximal end 203*a*.

Figure 8:
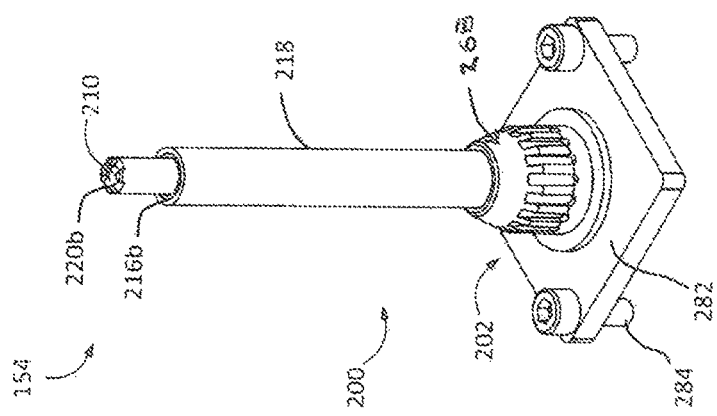
FIG. 8 is a perspective view of a portion of a retaining pin of the machine of FIG. 1.

Referring to FIG. 7A, the distal opening 210 is for fluid communication with the interior space 211 of the preform 112 in which the pin 154 is received. The distal opening 210 opens to the interior space 211 of the preform 112 when the preform 112 is retained on the pin 154. When the plunger abutment surface 209 is engaged by the preform closed end 118, the distal opening 210 is directed toward an inner surface of the preform 112, and in the example illustrated, the distal opening 210 is directed toward an inner surface of the preform closed end 118. Referring to FIG. 8, in the example illustrated, the distal opening 210 is disposed in a plunger upper endface 220*b* of the plunger 204 adjacent the plunger second end 207*b*. The distal opening 210 is adjacent the tip portion 205 and the plunger abutment surface 209 (see also FIG. 10) in the example illustrated.

Alternatively or additionally, the distal opening 210 can comprise one or more radially directed apertures adjacent the tip portion 205 and in fluid communication with the plunger flow channel 214. Referring to FIG. 12, in the example illustrated, the distal opening 210 includes a plurality of radially directed apertures 219 spaced between a plurality of upwardly protruding contact pads 221. In the example illustrated, the plunger abutment surface 209 comprises an upper surface of the contact pads 221.

Referring to FIG. 7A, when the plunger 204 is in the retracted position, the body flow channel 212 and the plunger flow channel 214 are in fluid communication. Referring to FIG. 5A, when the plunger 204 is in the advanced position, fluid communication between the body flow channel 212 and the plunger flow channel 214 is inhibited. When fluid communication is inhibited, fluid flow between the body and plunger flow channels 212, 214 is significantly reduced relative to when the body and plunger flow channels 212, 214 are in fluid communication (i.e. when the plunger 204 is in the retracted position). In the example illustrated, fluid flow between the body and plunger flow channels 212, 214 is generally stopped entirely when the plunger 204 is in the advanced position.

In the example illustrated, the body flow channel 212 extends along a first axial portion of the pin 154, and the plunger flow channel 214 extends along a second axial portion of the pin 154 different from the first axial portion. Referring to FIG. 10, in the example illustrated, the pin 154 includes a generally cylindrical body bore 225 extending axially through the body 200. The body bore 225 extends between the proximal opening 208 and an opening in a body upper endface 216*b* adjacent the body distal end 203*b* (see also FIG. 9). In the example illustrated, the plunger 204 is partially received within the body bore 225 when in the advanced and retracted positions. The body flow channel 212 comprises a portion of the body bore 225 (this portion sometimes referred to as a body flow channel portion). The body flow channel portion of the body bore 225 can extend from the proximal opening 208 to the plunger 204. In the example illustrated, the body flow channel portion of the body bore 225 extends between the proximal opening 208 and a plunger lower endface 220a of the plunger 204 adjacent the plunger first end 207a.

In the example illustrated, the body 200 includes an elongate conduit member 218 fixed to, and extending axially away from, the base 202. In the example illustrated, the conduit member 218 comprises the body distal end 203b. The body bore 225 extends through the base 202 and the conduit member 218.

In the example illustrated, the spring 250 is internal the body 200, and is disposed within the body bore 225 (and the body flow channel 212). In the example illustrated, the spring 250 is internal the conduit member 218 and external the base 202. Fluid flowing through the internal flow channel 206 can flow through the centre of the spring 250. Positioning the spring 250 within the body 200 may help protect the spring 250 from damage.

In the example illustrated, the pin 154 further includes a plunger bore 227 extending axially through the plunger 204. The plunger bore 227 extends from the distal opening 210 toward the body 200. In the example illustrated, the plunger bore 227 extends between the distal opening 210 and a plunger inner endface 223 of the plunger 204. The plunger inner endface 223 is internal the plunger 204 and adjacent the plunger first end 207a. The plunger inner endface 223 is closed off in the example illustrated. The plunger flow channel 214 comprises the plunger bore 227 in the example illustrated.

Referring to FIG. 7A, in the example illustrated, the internal flow channel 206 can further comprise an intermediate flow channel 215 for providing fluid communication between the plunger flow channel 214 and the body flow channel 212 when the plunger 204 is in the retracted position. In the example illustrated, the plunger 204 includes an intermediate opening 222 disposed in the plunger 204 axially between the proximal and distal openings 208, 210. In the example illustrated, the intermediate flow channel 215 comprises the intermediate opening 222. The plunger flow channel 214 extends between the distal opening 210 and the intermediate opening 222. The intermediate opening 222 can provide fluid communication between the plunger flow channel 214 and the body flow channel 212 when the plunger 204 is in the retracted position. In the example illustrated, the intermediate opening 222 and the body flow channel 212 are in fluid communication when the plunger 204 is in the retracted position, and fluid communication between the intermediate opening 222 and the body flow channel 212 is inhibited when the plunger 204 is in the advanced position.

Referring to FIG. 5A, the intermediate opening 222 is, in the example illustrated, provided in a recessed sidewall portion 224 of the plunger 204. The intermediate opening 222 and recessed sidewall portion 224 remain axially captive within the body bore 225 in the example illustrated. The intermediate opening 222 is radially spaced away from the inner cylindrical surface of the body bore 225 by a radial gap 226, both when the plunger 204 is in the advanced position and in the retracted position. In the example illustrated, the intermediate flow channel 215 comprises the radial gap 226. In the example illustrated, the recessed sidewall portion 224 is configured as a cylindrical plunger journal. In the example illustrated, the plunger journal has an outer diameter that is less than a body bore inner diameter of the portion of the body bore 225 in which the plunger journal is received.

In the example illustrated, the plunger 204 includes an outer cylindrical seal surface 228, and the body bore 225 includes a complementary inner cylindrical seal surface 229. The outer cylindrical seal surface 228 is disposed axially between the intermediate opening 222 and the tip portion 205 of the plunger 204. The inner cylindrical seal surface 229 is adjacent the body distal end 203b. In the example illustrated, the outer cylindrical seal surface 228 of the plunger 204 remains in sealed sliding engagement with the inner cylindrical seal surface 229 of the body bore 225 when the plunger 204 translates between the advanced and retracted positions.

Each retaining pin 154 may also be provided with an optional pin valve member 230 for selectively inhibiting or opening fluid communication between the proximal opening 208 and the distal opening 210 of the internal flow channel 206. The pin valve member 230 may selectively inhibit or open fluid communication between the body flow channel 212 and plunger flow channel 214.

In the example illustrated, the pin valve member 230 comprises a plunger blocking surface 232 fixed to the plunger 204 and a complementary body blocking surface 234 fixed to the body 200. In the example illustrated, the plunger blocking surface 232 comprises an outer cylindrical land surface fixed to the plunger 204, and the body blocking surface 234 comprises an inner cylindrical throat surface fixed to the body 200. The plunger blocking surface 232 is, in the example illustrated, adjacent the plunger first end 207a. The plunger blocking surface 232 is disposed axially between the recessed sidewall portion 224 (with the intermediate opening 222) and the plunger lower endface 220a. In the example illustrated, the plunger blocking surface 232 is substantially parallel to the pin axis 155. The plunger blocking surface 232 has a plunger blocking surface axial extent 236 (FIG. 7A) that can be in the range from about 0.5 mm to about 5 mm. In the example illustrated, the plunger blocking surface axial extent 236 is about 2 mm.

The body blocking surface 234 has a diameter sized to receive the plunger blocking surface 232 in a generally sealed, sliding fit when the plunger 204 is in the advanced position. The body blocking surface 234 has a body blocking surface axial extent 238 (FIG. 5A) that extends between an upper edge 240 (nearest the tip portion 205) and a lower edge 242 (further from the tip portion 205 than the upper edge 240). The body blocking surface axial extent 238 can be generally equal to the plunger blocking surface axial extent 236, and can be axially aligned with the plunger blocking surface 232 when the plunger 204 is in the advanced position. In the example illustrated, the body blocking surface 234 has an outer diameter that is less than a clearance diameter 246 of the body bore 225 below the lower edge 242 of the body blocking surface axial extent 238.

Referring to FIG. 5A, when the plunger 204 is in the advanced position, the plunger blocking surface 232 and the body blocking surface 234 are in sealed slidable engagement. Fluid flow between the plunger blocking surface 232 and the body blocking surface 234 is inhibited when the plunger 204 is in the advanced position.

Referring to FIG. 7A, in the example illustrated, when the plunger 204 is in the retracted position, the plunger blocking surface 232 is displaced axially clear of the body blocking surface 234, and a flow gap 248 is provided between the plunger blocking surface 232 and an inner surface of the body bore 225. In the example illustrated, the intermediate flow channel 215 comprises the flow gap 248. In the example illustrated, the flow gap 248 is annular, and is disposed between the outer cylindrical land surface fixed to the plunger 204, and an inner cylindrical surface of the body bore 225. In the example illustrated, fluid flows through the flow gap 248 in the direction 213 (FIG. 5A) when the plunger 204 is in the retracted position and fluid is evacuated from the interior space 211 of the preform 112 through the internal flow channel 206.

Optionally, the plunger blocking surface 232 and the body blocking surface 234 can be integrally formed with the plunger 204 and the body 200, respectively. Alternatively, the body blocking surface 234 and/or the plunger blocking surface 232 can be provided as separate members. Providing separate members that incorporate the plunger blocking surface 232 and/or the body blocking surface 234 may facilitate the use of different materials for the plunger blocking surface 232, the body blocking surface 234, and/or other portions of the body 200 or plunger 204.

In the example illustrated, the plunger 204 is formed of unitary, one-piece construction and the plunger blocking surface 232 is integral with the rest of the plunger 204. The plunger 204 can be formed of a thermally conductive material to assist heat transfer away from the preforms 112, and in the example illustrated, is made of aluminum.

Referring to FIG. 11, the body 200 can be integral, unitary construction or can comprise an assembly of distinct members. In the example illustrated, the body 200 comprises an assembly of a plurality of members, including the base 202, the conduit member 218, and a bushing 258, all of which co-operate to provide the body bore 225. Referring also to FIG. 7A, in the example illustrated, the bushing 258 is disposed within the conduit member 218 adjacent the body distal end 203b. In the example illustrated, the inner cylindrical seal surface 229 of the body bore 225 comprises at least an upper portion of the inner cylindrical surface of the bushing 258 (as viewed in FIG. 5A, with the upper portion adjacent the body distal end 203b). The body blocking surface 234 comprises a lower portion of the inner cylindrical surface of the bushing 258 (the lower portion identified as the axial extent 238 in FIG. 5A).

In the example illustrated, the conduit member 218 and bushing 258 are formed from different materials. The conduit member 218 is formed from aluminum and the bushing 258 is formed from plastic. The bushing 258 can be secured in the conduit member 218 using any suitable mechanism or fastener, and in the example illustrated, is secured in a press-fit configuration.

Optionally, movement of the plunger 204 can be constrained so that movement of the plunger 204 away from the base 202 is limited to the advanced position. Referring to FIG. 7A, in the example illustrated, the plunger 204 includes a plunger retaining surface 262, and the body 200 includes a complementary body retaining surface 264. The plunger retaining surface 262 is spaced apart from the body retaining surface 264 when the plunger 204 is in the retracted position, and bears against the body retaining surface 264 when the plunger 204 is in the advanced position to inhibit movement of the plunger 204 beyond the advanced position. In the example illustrated, the intermediate flow channel 215 is at least partially bounded by the plunger retaining surface 262 when the plunger 204 is in the retracted position.

Referring to FIG. 12, in the example illustrated, the plunger 204 includes four protrusions 260 extending radially outwardly from a lower portion of the plunger 204 below (as illustrated in FIG. 12) the plunger blocking surface 232. Each protrusion 260 extends generally laterally outwardly (i.e. generally orthogonally to the plunger axis) and includes a respective, axial-facing surface 263 directed upwardly (as illustrated in FIG. 12) and away from the base 202. In the example illustrated, the plunger retaining surface 262 comprises the axial-facing surfaces 263. Referring to FIG. 7A, in the example illustrated, the bushing 258 includes a generally axial-facing endface 265 directed downwardly (as illustrated in FIG. 7A) toward the base 202 and in facing relation to the axial-facing surfaces 263. In the example illustrated, the body retaining surface 264 comprises the axial-facing endface 265 of the bushing 258.

In the example illustrated, the protrusions 260 are positioned axially below (as illustrated in FIG. 7A) the plunger blocking surface 232. The protrusions 260 and plunger retaining surface 262 are retained within the body bore 225.

Referring to FIG. 12, the plunger retaining surface 262 is separate from the plunger blocking surface 232, and in the example illustrated, is downstream from the plunger blocking surface 232 when fluid is being evacuated from the interior space 211 of the preform 112 through the internal flow channel 206 (see also FIG. 7A). The plunger retaining surface 262 is generally orthogonal to the plunger blocking surface 232 in the example illustrated.

Referring to FIG. 13, in the example illustrated, each protrusion 260 also includes at least one contact surface 266 facing the base 202. The contact surfaces 266 are opposite the axial-facing surfaces 263, and are sized and positioned to abut an upper end of the spring 250. Referring to FIG. 7A, a lower end of the spring 250 is supported by a spring support surface 267 of the body 200 provided within the body bore 225. In the example illustrated, the spring support surface 267 comprises a shoulder of the conduit member 218 provided within the body bore 225. A spring biasing force is transferred from the spring 250 to the plunger 204 via the protrusions 260.

Figure 14:
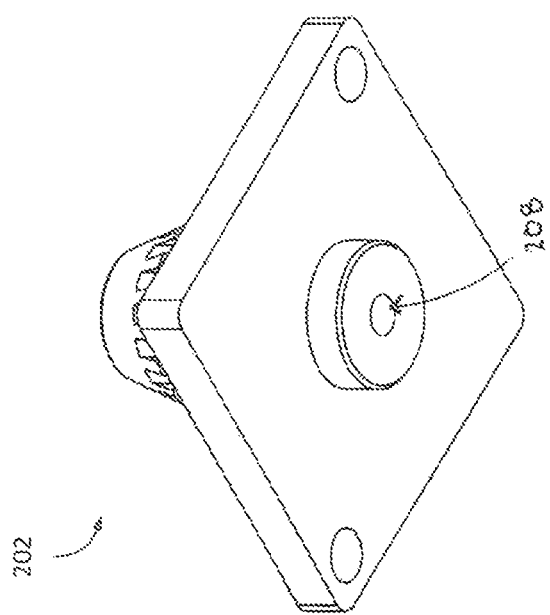
FIG. 14 is an upper perspective view of a base of the retaining pin of FIG. 8.
Figure 15:
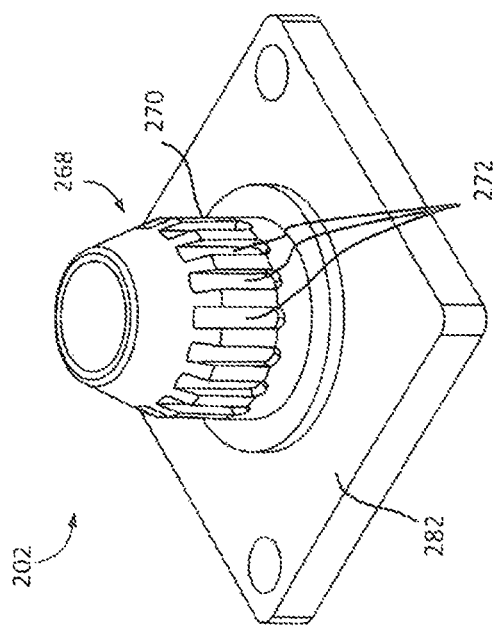
FIG. 15 is a lower perspective view of the base of FIG. 14.

Referring to FIG. 14, in the example illustrated, the base 202 includes a base journal 268 having a base journal outer surface 270. The base journal outer surface 270 is sized smaller than a neck region inner surface 124c (FIG. 2B) of the preform neck region 117 to provide a generally annular base flowgate 274 (FIG. 7) between the base journal outer surface 270 and the neck region inner surface 124c when the preform 112 is retained on the pin 154. Optionally, as illustrated, the base 202 can include at least one notch 272 formed in the base journal outer surface 270 to increase the fluid flow capacity of the base flowgate 274. The base 202 also includes an attachment flange 282 that is configured to receive fasteners 284 (FIG. 11) for attaching the pin 154 to the transfer shell 142.

In the example illustrated, the base flowgate 274 forms a flow restriction when the plunger 204 is in the retracted position and fluid is drawn into the preform 112 through the base flowgate 274 and evacuated from the preform 112 through the internal flow channel 206. In the example illustrated, the effective cross-sectional area of the base flowgate 274 is less than the effective cross-sectional area of the internal flow channel 206, and the fluid flow through the internal flow channel 206 maintains a vacuum in the interior space 211 of the preform 112 to retain the preform 112 on the pin 154. The fluid flow can also provide convective cooling of the preform 112. The size of the base flowgate 274 can be selected so that the vacuum force is sufficient to overcome the biasing force of the spring 250 when the plunger 204 is in the retracted position. Fluid flow through the pin 154 is illustrated using arrows in FIGS. 6 and 7A.

The neck region inner surface 124c of the preform neck region 117 can be generally cylindrical or can have a more complex profile. The base journal outer surface 270 can optionally match the profile of the neck region inner surface 124c. The preform neck region 117 has a neck region inner diameter 278 (FIG. 2B). The base journal 268 may have a base journal outer diameter 280 (FIG. 9) that is in the range from about 90 percent to about 99 percent of the neck region inner diameter 278. In the example illustrated, the base journal outer diameter 280 is about 98 percent of the neck region inner diameter 278. The difference between the neck region inner diameter 278 and the base journal outer diameter 280 generally defines the gate cross-sectional area of the base flowgate 274.

The internal flow channel 206 and the base flowgate 274 may generally be configured to accommodate a fluid flow rate from about 0.5 liters/sec to about 5 liters/sec. In the example illustrated, the internal flow channel 206 and the base flowgate 274 are configured to accommodate a fluid flow rate of about 1.5 liters/sec. In the example illustrated, the retaining/cooling fluid flow can be configured to provide a vacuum in a range from about 5 to about 7 kPa. The fluid flow can be provided while the plunger 204 is moving from the advanced position to the retracted position. As illustrated in FIGS. 5 to 7, the pin 154 and the preform 112 may be drawn together while the preform 112 is held in a cooling tube 162 on the take-out plate 160. A single pin 154 and a single cooling tube 162 are illustrated in FIGS. 5 to 7 for clarity, but the other pins 154 and tubes 162 can have a similar configuration.

Figure 16:
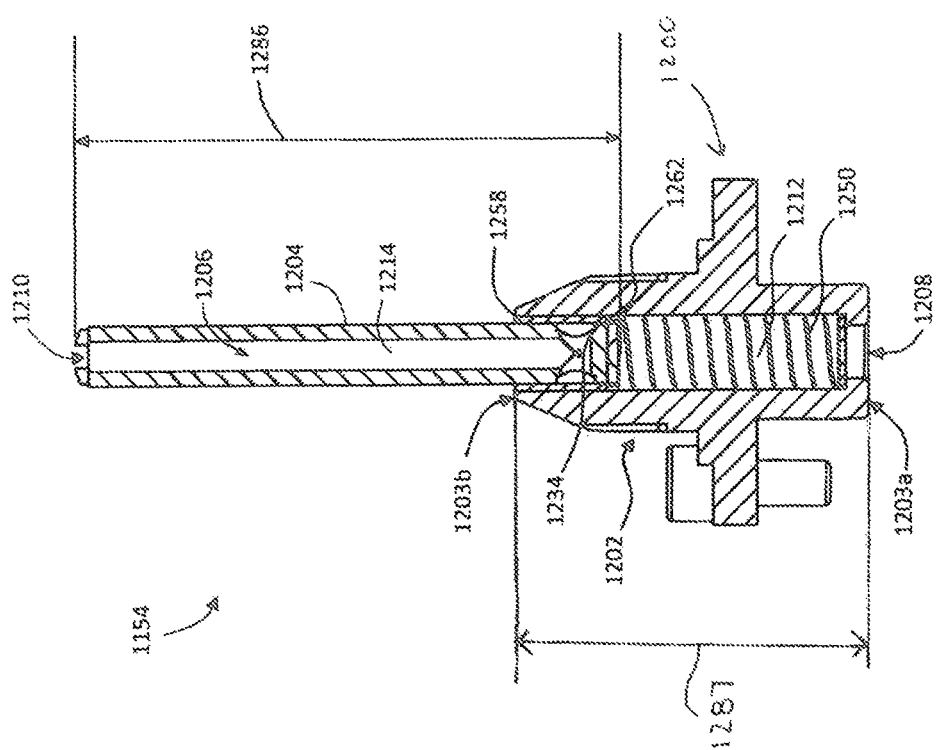
FIG. 16 is a cross-sectional view of an alternative example of a retaining pin for a machine like that shown in FIG. 1.

Referring to FIG. 16, another example of a retaining pin 1154 is illustrated. The pin 1154 has similarities to the pin 154, and like features are identified by like reference characters, incremented by 1000.

The retaining pin 1154 includes a body 1200 and a plunger 1204. The plunger 1204 is coupled to the body 1200 and movable relative to the body 1200 between advanced and retracted positions. In the example illustrated, the plunger 1204 has a plunger axial extent 1286 that is relatively longer than a body axial extent 1287 of the body 1200. The body axial extent 1287 is approximately two-thirds the length of the plunger axial extent 1286 in the example illustrated. The plunger 1204 is coupled to the base 1202 of the body 1200. The base 1202 extends between the body proximal and distal ends 1203a, 1203b, and the spring 1250 is internal the base 1202. The bushing 1258 is included as a separate member of the body 1200. In other examples, the bushing 1258, or at least one or both of the body blocking surface 1234 and the body retaining surface 1264, can be integrally formed with the rest of the body 1200.

In the example illustrated, the pin 1154 includes an internal flow channel 1206 extending through the pin 1154 between a proximal opening 1208 in the body 1200, and a distal opening 1210 in the plunger 1204. The internal flow channel 1206 includes a body flow channel 1212 extending through the body 1200, and a plunger flow channel 1214 extending through the plunger 1204. The body flow channel 1212 extends from the proximal opening 1208. The proximal opening 1208 is for fluid communication with a suction source. The plunger flow channel 1214 extends from the distal opening 1210. The distal opening 1210 is for fluid communication with the interior space 1211 of the preform 1112 in which the pin 1154 is received.

When the plunger 1204 is in the retracted position, the body flow channel 1212 and the plunger flow channel 1214 are in fluid communication. When the plunger 1204 is in the advanced position, fluid communication between the body flow channel 1212 and the plunger flow channel 1214 is inhibited.

Figure 18:
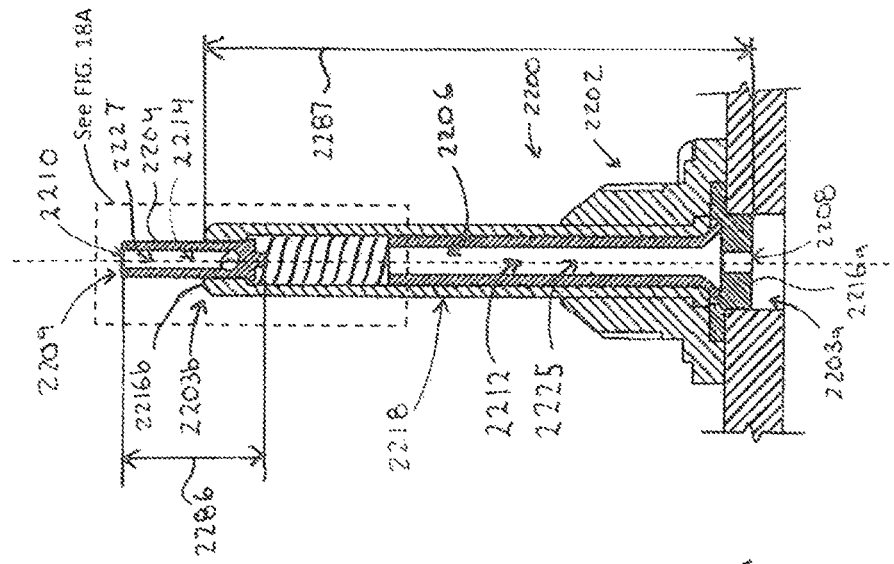
FIG. 18 is a cross-sectional view of the retaining pin of FIG. 17 taken along line 18-18 of FIG. 17, with the retaining pin shown in a first condition.

Referring to FIG. 18, another example of a retaining pin 2154 for handling a preform 2112 is illustrated. The pin 2154 has similarities to the pin 154, and like features are identified by like reference characters, incremented by 2000. The preform 2112 has similarities to the preform 112, and like features are identified by like reference characters, incremented by 2000.

The pin 2154 includes a body 2200. The body 2200 extends between a body proximal end 2203a and a body distal end 2203b spaced apart from the body proximal end 2203a. The body 2200 includes a base 2202. The base 2202 includes the body proximal end 2203a.

Figure 19:
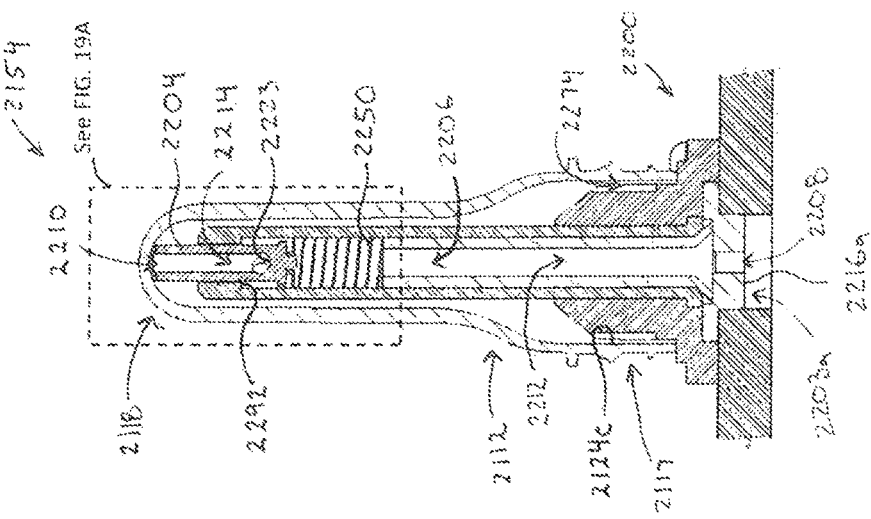
FIG. 19 is a cross-sectional view of the retaining pin of FIG. 18, shown in a second condition.

The pin 2154 further includes a plunger 2204 movably coupled to the body 2200. In the example illustrated, the plunger 2204 is movable relative to the body 2200 between an advanced position (FIG. 18) and a retracted position (FIG. 19). In the example illustrated, the plunger 2204 is biased toward the advanced position. The plunger 2204 is biased toward the advanced position by a biasing member, which in the example illustrated, comprises a compression spring 2250.

Referring to FIG. 21, in the example illustrated, the plunger 2204 includes a plunger first end 2207a coupled to the body 2200, and a plunger second end 2207b spaced apart from the plunger first end 2207a away from the body 2200. In the example illustrated, the plunger 2204 includes a plunger abutment surface 2209 fixed to the plunger 2204. The plunger abutment surface 2209 is directed away from the body 2200, and in the example illustrated, is adjacent the plunger second end 2207b and in facing relation to a preform inner surface of the preform closed end 2118 when the preform 2112 is retained on the pin 2154 (see FIG. 19A). In the example illustrated, the plunger 2204 provides a tip portion 2205 of the pin 2154. Referring to FIG. 18, in the example illustrated, the plunger 2204 has a plunger axial extent 2286 that is relatively shorter than a body axial extent 2287 of the body 2200. The plunger axial extent 2286 is approximately one-quarter the length of the body axial extent 2287 in the example illustrated.

Referring to FIGS. 18 to 19, in the example illustrated, the plunger 2204 is movable from the advanced position to the retracted position by engagement of the plunger abutment surface 2209 with a preform inner surface of the preform closed end 2118 when the preform 2112 and the pin 2154 are moved toward each other.

Referring to FIG. 18, in the example illustrated, the pin 2154 includes an internal flow channel 2206 extending through the pin 2154 between a proximal opening 2208 in the body 2200, and a distal opening 2210 in the plunger 2204. The internal flow channel 2206 includes a body flow channel 2212 extending through the body 2200, and a plunger flow channel 2214 extending through the plunger 2204. The plunger flow channel 2214 extends from the distal opening 2210. The body flow channel 2212 extends from the proximal opening 2208.

The proximal opening 2208 is for fluid communication with a suction source. In the example illustrated, the proximal opening 2208 is disposed in a body lower endface 2216a of the body 2200 adjacent the body proximal end 2203a.

The distal opening 2210 is for fluid communication with the interior space 2211 of the preform 2112 in which the pin 2154 is received (see FIG. 19A). When the plunger abutment surface 2209 is engaged by the preform closed end 2118, the distal opening 2210 is directed toward an inner surface of the preform 2112, and in the example illustrated, the distal opening 2210 is directed toward an inner surface of the preform closed end 2118. In the example illustrated, the distal opening 2210 is disposed in a plunger upper endface 2220b of the plunger 2204 adjacent the plunger second end 2207b (See FIG. 18A).

Alternatively or additionally, the distal opening 2210 can comprise one or more radially directed apertures adjacent the tip portion 2205 and in fluid communication with the plunger flow channel 2214. Referring to FIG. 21, in the example illustrated, the distal opening 2210 includes a plurality of radially directed apertures 2219 spaced between a plurality of upwardly protruding contact pads 2221. In the example illustrated, the plunger abutment surface 2209 comprises an upper surface of the contact pads 2221.

When the plunger 2204 is in the retracted position (FIG. 19A), the body flow channel 2212 and the plunger flow channel 2214 are in fluid communication. When the plunger 2204 is in the advanced position (FIG. 18A), fluid communication between the body flow channel 2212 and the plunger flow channel 2214 is inhibited. In the example illustrated, fluid flow between the body flow channel 2212 and the plunger flow channel 2214 is generally stopped entirely when the plunger 2204 is in the advanced position.

In the example illustrated, the pin 2154 includes a generally cylindrical body bore 2225 extending axially through the body 2200. The body bore 2225 extends between the proximal opening 2208 and an opening in a body upper endface 2216b of the body 2200 adjacent the body distal end 2203b. In the example illustrated, at least a portion of the plunger 2204 is received within the body bore 2225 when the plunger 2204 is in the advanced and retracted positions. The body flow channel 2212 comprises a body flow channel portion of the body bore 2225. The body flow channel portion of the body bore 2225 can extend from the proximal opening 2208 to the plunger 2204. In the example illustrated, the body flow channel portion of the body bore 2225 extends between the proximal opening 2208 and a plunger lower endface 2220a of the plunger 2204 adjacent the plunger first end 2207a.

Referring to FIG. 18, in the example illustrated, the body 2200 includes an elongate conduit member 2218 fixed to, and extending axially away from, the base 2202. In the example illustrated, the conduit member 2218 comprises the body distal end 2203b. The body bore 2225 extends through the base 2202 and the conduit member 2218.

Referring to FIG. 19, in the example illustrated, the spring 2250 is internal the body 2200, and is disposed within the body bore 2225 (and the body flow channel 2212). In the example illustrated, the spring 2250 is internal the conduit 2218, and external the base 2202.

Referring to FIG. 19A, in the example illustrated, the pin 2154 further includes a plunger bore 2227 extending axially through the plunger 2204. The plunger bore 2227 extends from the distal opening 2210 toward the body 2200. In the example illustrated, the plunger bore 2227 extends between the distal opening 2210 and a plunger inner endface 2223 (FIG. 21) of the plunger 2204. The plunger inner endface 2223 is internal the plunger 2204 and adjacent the plunger first end 2207a. The plunger inner endface 2223 is closed off in the example illustrated. The plunger flow channel 214 comprises the plunger bore 2227 in the example illustrated.

Referring to FIG. 19A, in the example illustrated, the internal flow channel 2206 can further comprise an intermediate flow channel 2215 for providing fluid communication between the plunger flow channel 2214 and the body flow channel 2212 when the plunger 2204 is in the retracted position. In the example illustrated, the plunger 2204 includes an intermediate opening 2222 disposed in the plunger 2204 axially between the proximal and distal openings 2208, 2210. In the example illustrated, the intermediate flow channel 2215 comprises the intermediate opening 2222. The plunger flow channel 2214 extends between the distal opening 2210 and the intermediate opening 2222. The intermediate opening 2222 can provide fluid communication between the plunger flow channel 2214 and the body flow channel 2212 when the plunger 2204 is in the retracted position. In the example illustrated, the intermediate opening 2222 and the body flow channel 2212 are in fluid communication when the plunger 2204 is in the retracted position, and fluid communication between the intermediate opening 2222 and the body flow channel 2212 is inhibited when the plunger 2204 is in the advanced position.

Referring to FIG. 19A, the intermediate opening 2222 is radially spaced away from an inner cylindrical surface of the body bore 2225 by a radial gap 2226 when the plunger 2204 is in the retracted position. In the example illustrated, the intermediate flow channel 2215 comprises the radial gap 2226. The intermediate opening 2222 remains axially captive within the body bore 2225 in the example illustrated.

Referring to FIG. 18A, in the example illustrated, the plunger 2204 includes an outer cylindrical seal surface 2228, and the body bore 2225 includes a complementary inner cylindrical seal surface 2229. In the example illustrated, the outer cylindrical seal surface 2228 of the plunger 2204 remains in sealed sliding engagement with the inner cylindrical seal surface 2229 of the body bore 2225 when the plunger 2204 translates between the advanced and retracted positions.

Referring to FIG. 18A, each pin 2154 may also be provided with an optional pin valve member 2230 for selectively inhibiting or opening fluid communication between the proximal opening 2208 and the distal opening 2210 of the internal flow channel 2206. The pin valve member 2230 may selectively inhibit or open fluid communication between the body flow channel 2212 and plunger flow channel 2214.

In the example illustrated, the pin valve member 2230 comprises a plunger blocking surface 2232 fixed to the plunger 2204 and a complementary body blocking surface 2234 fixed to the body 2200. In the example illustrated, the plunger blocking surface 2232 comprises an outer cylindrical surface fixed to the plunger 2204, and the body blocking surface 2234 comprises an inner cylindrical throat surface fixed to the body 2200. The plunger blocking surface 2232 is, in the example illustrated, adjacent the plunger first end 2207a. The plunger blocking surface 2232 is disposed axially between the intermediate opening 2222 and the plunger lower endface 2220a. The body blocking surface 2234 has a diameter sized to receive the plunger blocking surface 2232 in a generally sealed, sliding fit when the plunger 2204 is in the advanced position.

Referring to FIG. 18A, when the plunger 2204 is in the advanced position, the plunger blocking surface 2232 and the body blocking surface 2234 are in sealed slidable engagement. Fluid flow between the plunger blocking surface 2232 and the body blocking surface 2234 is inhibited when the plunger 2204 is in the advanced position.

Referring to FIG. 19A, in the example illustrated, when the plunger 2204 is in the retracted position, the plunger blocking surface 2232 is displaced axially clear of the body blocking surface 2234, and a flow gap 2248 is provided between the plunger blocking surface 2232 and an inner surface of the body bore 2225. In the example illustrated, the intermediate flow channel 2215 comprises the flow gap 2248. In the example illustrated, the flow gap 2248 is annular.

In the example illustrated, the plunger blocking surface 2232 and the body blocking surface 2234 are integrally formed with the plunger 2204 and the conduit member 2218 of the body 2200, respectively.

Referring to FIG. 20, the body 2200 can be formed from a plurality of different members. In the example illustrated, the body 2200 includes the base 2202 and the conduit member 2218. The conduit member 2218 includes an outer sleeve portion 2288a extending from the base 2202 to the body distal end 2203b, and an internal insert portion 2288b extending axially through a proximal (lower) portion of the sleeve portion 2288a (see also FIG. 18). In the example illustrated, a bottom end of the sleeve portion 2288a has a sleeve portion opening. The sleeve portion opening has a diameter sized large enough to accommodate insertion of the plunger 2204, the spring 2250, and the insert portion 2288b into a sleeve portion bore extending axially through the sleeve portion 2288a. The body bore 2225 comprises the sleeve portion bore.

In the example illustrated, the base 2202 includes an endcap 2290 for plugging a base opening in an underside of the base 2202 through which the sleeve portion 2288a, plunger 2204, spring 2250, and insert portion 2288b are inserted during assembly of the pin 2154. The endcap 2290 includes an endcap opening that is smaller than the base opening. In the example illustrated, the endcap 2290 comprises the base proximal end 203a, and the proximal opening 208 comprises the endcap opening (see also FIG. 18). The base 2202, the sleeve portion 2288a, and the insert portion 2288b co-operate to provide the body flow channel 2212 (and the body bore 2225).

Optionally, movement of the plunger 2204 can be constrained so that movement of the plunger 2204 away from the base 2202 is limited to the advanced position. Referring to FIG. 19A, in the example illustrated, the plunger 2204 includes a plunger retaining surface 2262, and the body 2200 includes a complementary body retaining surface 2264. The plunger retaining surface 2262 is spaced apart from the body retaining surface 2264 when the plunger 2204 is in the retracted position, and bears against the body retaining surface 2264 when the plunger 2204 is in the advanced position to inhibit movement of the plunger 2204 beyond the advanced position. In the example illustrated, the intermediate flow channel 2215 is at least partially bounded by the plunger retaining surface 2262 when the plunger 2204 is in the retracted position.

Referring to FIG. 21, in the example illustrated, the plunger 2204 includes four protrusions 2260 extending radially outwardly from a lower portion of the plunger 2204 below (as illustrated in FIG. 21) the plunger blocking surface 2232. Each protrusion 2260 extends generally laterally outwardly (i.e. generally orthogonally to the plunger axis) and includes a respective, axial-facing surface 2263 directed upwardly (as illustrated in FIG. 21) and away from the base 2202. In the example illustrated, the plunger retaining surface 2262 comprises the axial-facing surfaces 2263.

Referring to FIG. 19A, in the example illustrated, a body bore step surface 2292 is provided within the body bore 2225 adjacent the body distal end 203b. The body bore step surface 2292 is directed downwardly (as illustrated in FIG. 19A) toward the base 2202 and is in facing relation to the axial-facing surfaces 2263. In the example illustrated, the body retaining surface 264 comprises the body bore step surface 2292.

Referring to FIG. 22, in the example illustrated, each protrusion 2260 also includes at least one contact surface 2266 facing the base 2202. The contact surfaces 2266 are opposite the axial-facing surfaces 2263, and are sized and positioned to abut an upper end of the spring 2250. A lower end of the spring 2250 is supported by a spring support surface 2267 (FIG. 18A) of the body 200 provided within the body bore 2225. In the example illustrated, the spring support surface 2267 comprises an upper endface of the insert portion 2288b of the conduit member 2218. A spring biasing force is transferred from the spring 2250 to the plunger 2204 via the protrusions 2260.

Figure 17:
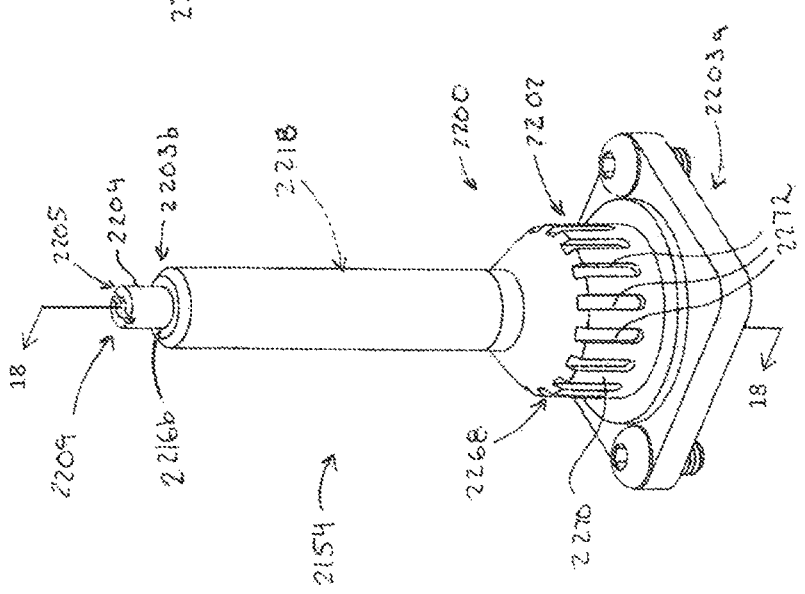
FIG. 17 is a perspective view of an alternative example of a retaining pin for a machine like that shown in FIG. 1.

Referring to FIG. 17, in the example illustrated, the base 2202 includes a base journal 2268 having a base journal outer surface 2270. Referring to FIG. 19, the base journal outer surface 2270 is sized smaller than a neck region inner surface 2124c of the preform neck region 2117 to provide a generally annular base flowgate 2274 between the base journal outer surface 2270 and the neck region inner surface 2124c when the preform 2112 is retained on the pin 2154. Referring to FIG. 17, the base 2202 can optionally include at least one notch 2272 formed in the base journal outer surface 2270 to increase the fluid flow capacity of the base flowgate 2274.

In the example illustrated, when the plunger 2204 is in the retracted position the base flowgate 2274 forms a flow restriction when fluid is drawn into the preform 2112 through the base flowgate 2274 and evacuated from the preform 2112 through the internal flow channel 2206. The fluid flow through the internal flow channel 2206 maintains a vacuum in the interior space 2211 of the preform 2112 to retain the preform 2112 on the pin 2154. The fluid flow can also provide convective cooling of the preform 2112. Fluid flow through the pin 2154 is illustrated using arrows in FIG. 19A.

Figure 23:
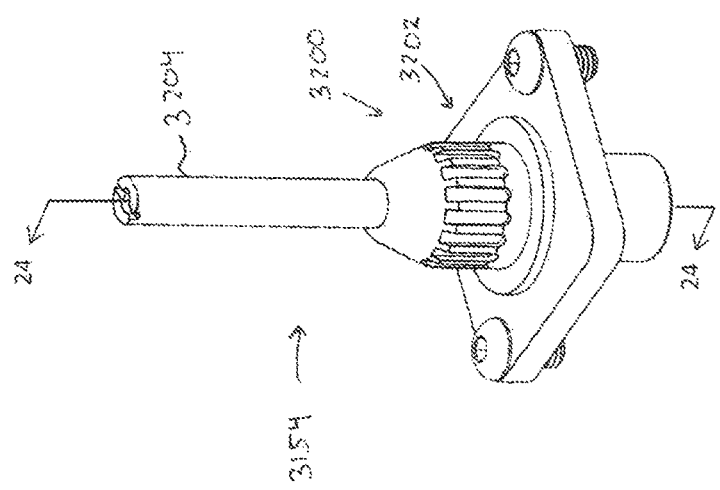
FIG. 23 is a perspective view of an alternative example of a retaining pin for a machine like that shown in FIG. 1.
Figure 28:
FIG. 28 is a lower perspective view of the plunger of FIG. 27.
Figure 27:
FIG. 27 is an upper perspective view of a plunger of the retaining pin of FIG. 23.
Figure 26:
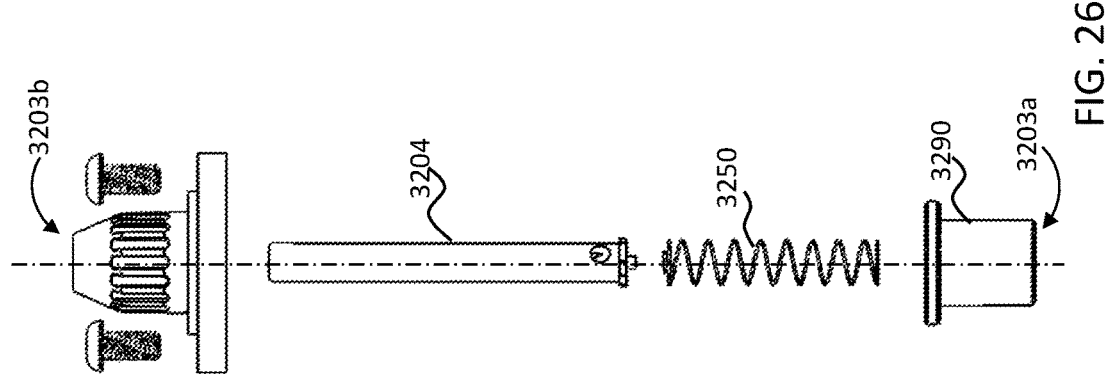
FIG. 26 is an exploded view of the retaining pin of FIG. 23.

Referring to FIG. 23, another example of a retaining pin 3154 for handling a preform 3112 is illustrated. The pin 3154 has similarities to the pin 2154, and like features are identified by like reference characters, incremented by 1000. The preform 3112 has similarities to the preform 112, and like features are identified by like reference characters, incremented by 3000.

Figure 24:
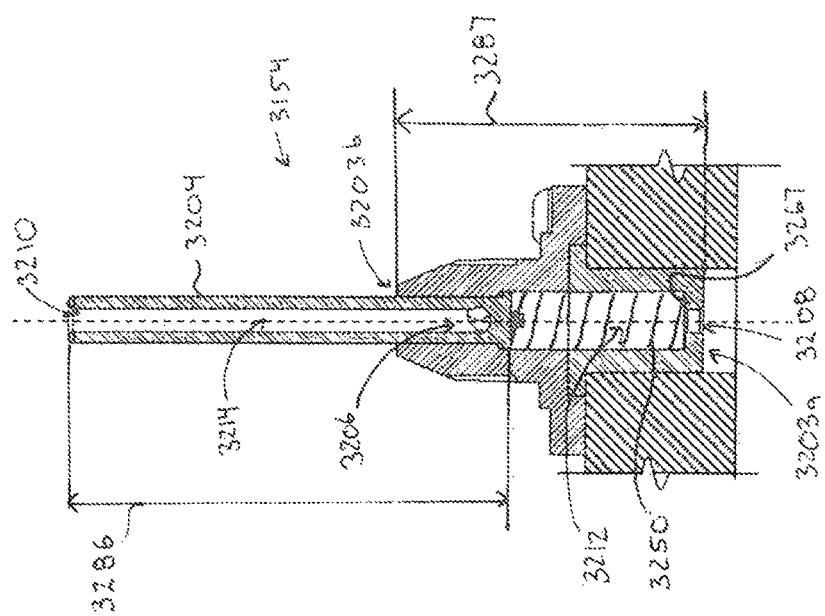
FIG. 24 is a cross-sectional view of the retaining pin of FIG. 23 taken along line 24-24 of FIG. 23, with the retaining pin shown in a first condition.

The retaining pin 3154 includes a body 3200 and a plunger 3204. The plunger 3204 is coupled to the body 3200 and movable relative to the body 3200 between advanced and retracted positions. Referring to FIG. 24, the plunger 3204 has a plunger axial extent 3286 that is relatively longer than a body axial extent 3287 of the body 2200. The body axial extent 3287 is approximately two-thirds the length of the plunger axial extent 3286 in the example illustrated. The base 3202 of the body 3200 extends between the body proximal and distal ends 3203a, 3203b, and the spring 3250 is internal the base 3202. The end cap 3290 of the base 3202 comprises the spring support surface 3267 in the example illustrated.

Figure 25:
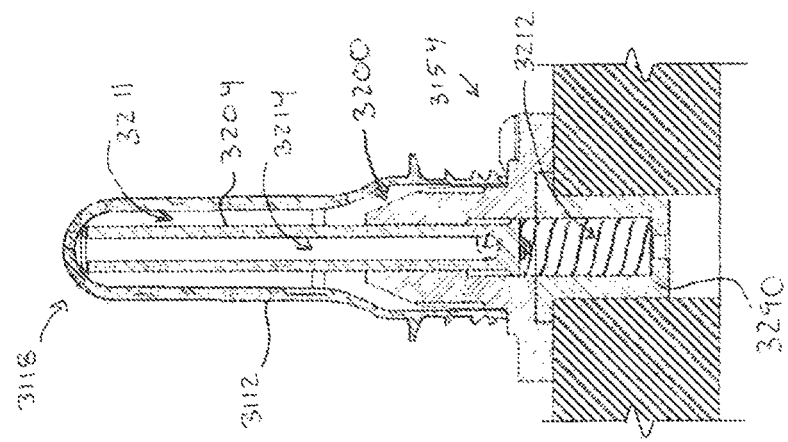
FIG. 25 is a cross-sectional view of the retaining pin of FIG. 24, shown in a second condition.

In the example illustrated, the pin 3154 includes an internal flow channel 3206 extending through the pin 3154 between a proximal opening 3208 in the body 3200, and a distal opening 3210 in the plunger 3204. The internal flow channel 3206 includes a body flow channel 3212 extending through the body 3200, and a plunger flow channel 3214 extending through the plunger 3204. The body flow channel 3212 extends from the proximal opening 3208. The proximal opening 3208 is for fluid communication with a suction source. The plunger flow channel 3214 extends from the distal opening 3210. The distal opening 3210 is for fluid communication with the interior space 3211 (FIG. 25) of the preform 3112 in which the pin 3154 is received.

When the plunger 3204 is in the retracted position, the body flow channel 3212 and the plunger flow channel 3214 are in fluid communication. When the plunger 3204 is in the advanced position, fluid communication between the body flow channel 3212 and the plunger flow channel 3214 is inhibited.

Figure 30:
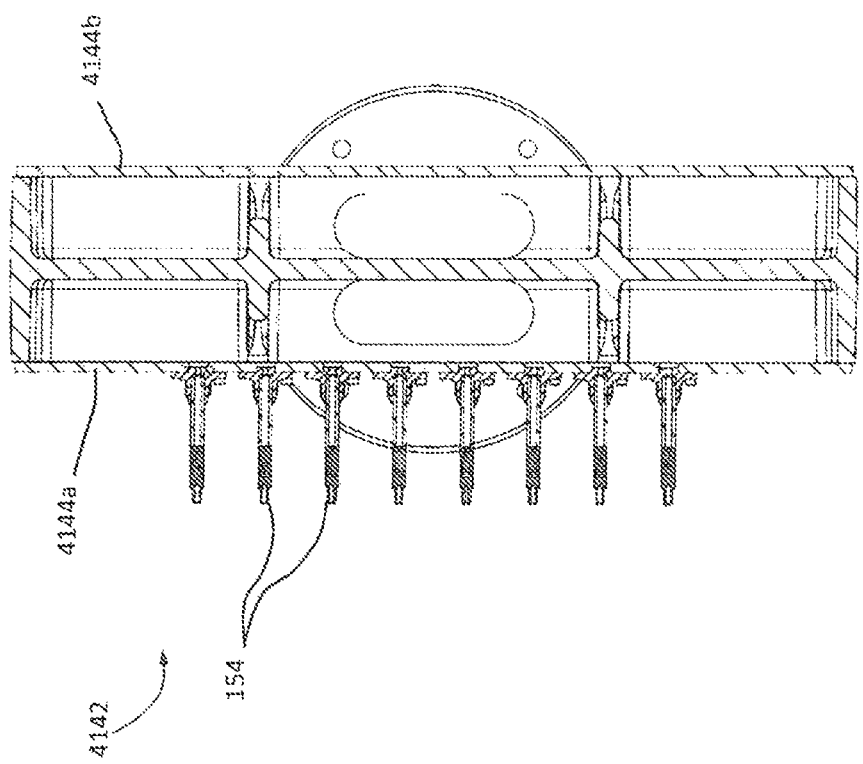
FIG. 30 is a cross-sectional view, similar to FIG. 4, of the transfer shell of FIG. 29.

Referring to FIGS. 29 and 30 another example of a transfer shell 4142 is illustrated in cross-sectional views that generally correspond to the views of FIGS. 3 and 4. The transfer shell 4142 has similarities to the shell 142, and like features are identified by like reference characters, incremented by 4000. The transfer shell 4142 includes a shell side 4144*a* for supporting pins 154. The shell side 4144*b* does not support pins 154 in the example illustrated.

The invention claimed is:

1. A retaining pin for handling preforms molded in an injection molding machine, the preforms having a preform open end and a preform closed end opposite the preform open end, the pin extending along a pin axis and comprising:
    a) a body;
    b) a plunger movably coupled to the body, the plunger biased toward an advanced position and movable to a retracted position by engagement of a plunger abutment surface fixed to the plunger with a preform inner surface of the preform closed end when the preform and retaining pin are moved toward each other; and
    c) an internal flow channel extending through the pin between a proximal opening in the body and a distal opening in the plunger, the proximal opening for fluid communication with a suction source, the internal flow channel including a body flow channel in the body and a plunger flow channel in the plunger, the body flow channel extending from the proximal opening and the plunger flow channel extending from the distal opening, the body flow channel and the plunger flow channel in fluid communication when the plunger is in the retracted position, and fluid communication between the body flow channel and the plunger flow channel inhibited when the plunger is in the advanced position.

2. The retaining pin of claim 1, wherein the plunger includes an intermediate opening disposed in the plunger axially between the proximal and distal openings, the plunger flow channel extending between the distal opening and the intermediate opening, the intermediate opening and the body flow channel in fluid communication when the plunger is in the retracted position, and fluid communication between the intermediate opening and the body flow channel inhibited when the plunger is in the advanced position.

3. The retaining pin of claim 1, wherein the distal opening is adjacent the plunger abutment surface.

4. The retaining pin of claim 1, wherein the plunger includes a plunger first end coupled to the body and a plunger second end spaced apart from the plunger first end, the distal opening adjacent the plunger second end and facing an inner surface of the preform when the plunger abutment surface is engaged by the preform closed end.

5. The retaining pin of claim 4, wherein the plunger abutment surface is adjacent the plunger second end.

6. The retaining pin of claim 1 further comprising a plunger blocking surface fixed to the plunger and a complementary body blocking surface fixed to the body, wherein when the plunger is in the advanced position the plunger blocking surface and the body blocking surface are in sealed slidable engagement and inhibit fluid communication between the plunger flow channel and the body flow channel, and when the plunger is in the retracted position, the body flow channel and the plunger flow channel are in fluid communication via a flow gap provided between the plunger blocking surface and an inner surface of the body flow channel.

7. The retaining pin of claim 6, wherein the internal flow channel further comprises an intermediate flow channel, the intermediate flow channel providing fluid communication between the plunger flow channel and the body flow channel when the plunger is in the retracted position, the intermediate flow channel comprising the flow gap.

8. The retaining pin of claim 6, wherein the flow gap is annular.

9. The retaining pin of claim 6, wherein the plunger translates from the advanced position to the retracted position in a direction parallel to the pin axis and toward the proximal opening, and fluid flows through the flow gap in the direction when the plunger is in the retracted position and fluid is evacuated from the preform through the internal flow channel.

10. The retaining pin of claim 6, wherein the plunger blocking surface is substantially parallel to the pin axis.

11. The retaining pin of claim 6, wherein the plunger includes a plunger first end coupled to the body and a plunger second end spaced apart from the plunger first end, the plunger blocking surface adjacent the plunger first end and the distal opening adjacent the plunger second end.

12. The retaining pin of claim 6, wherein the plunger includes a plunger retaining surface and the body includes a complementary body retaining surface, the plunger retaining surface spaced apart from the body retaining surface when the plunger is in the retracted position, and the plunger retaining surface bearing against the body retaining surface when the plunger is in the advanced position to inhibit movement of the plunger beyond the advanced position.

13. The retaining pin of claim 12, wherein the plunger retaining surface is separate from the plunger blocking surface.

14. The retaining pin of claim 12, wherein the plunger retaining surface is orthogonal to the plunger blocking surface.

15. The retaining pin of claim 1 further comprising a biasing member biasing the plunger toward the advanced position.

16. The retaining pin of claim 15, wherein the biasing member is internal the body.

17. The retaining pin of claim 16, wherein the biasing member is disposed within the body flow channel.

18. The retaining pin of claim 1, wherein the preform has a neck region adjacent the preform open end and the body includes a base, the base including a base journal having a base journal outer surface sized smaller than a neck region inner surface of the preform neck region to provide a generally annular base flowgate between the base journal outer surface and the neck region inner surface, the base flowgate forming a flow restriction when the plunger is in the retracted position and fluid is drawn into the preform through the base flowgate and evacuated from the preform through the internal flow channel.

19. The retaining pin of claim 18, wherein the base journal outer surface includes at least one notch to increase fluid flow capacity of the base flowgate.

20. The retaining pin of claim 18, wherein the body includes an elongate conduit member coupled to the base, the base comprising a proximal end of the body and the conduit member comprising a distal end of the body.

21. The retaining pin of claim 1, wherein the plunger translates between the advanced and retracted positions parallel to the pin axis.

22. The retaining pin of claim 1, wherein the plunger flow channel extends along a plunger channel axis that is parallel to the pin axis.

23. The retaining pin of claim 22, wherein the body flow channel extends along a body channel axis that is parallel to the pin axis.

24. The retaining pin of claim 23, wherein the plunger channel axis and the body channel axis are coaxial.

25. The retaining pin of claim 1 further comprising a body bore extending through the body from the proximal opening to a distal end of the body, wherein at least a portion of the plunger is received within the body bore when the plunger is in the advanced and retracted positions.

26. The retaining pin of claim 25, wherein the body flow channel comprises a portion of the body bore extending from the proximal opening to the plunger.

27. A retaining pin for handling preforms molded in an injection molding machine, the preforms having a preform open end and a preform closed end opposite the preform open end, the retaining pin comprising:
   a) a body including an internal body flow channel for fluid communication with a suction source; and
   b) a plunger coupled to the body and movable relative to the body between an advanced position and a retracted position, the plunger including an internal plunger flow channel for fluid communication with an interior space of the preform, the plunger further including a plunger abutment surface directed away from the body, the plunger biased toward the advanced position and movable to the retracted position by engagement of the plunger abutment surface with a preform inner surface of the preform closed end when the preform and retaining pin are moved toward each other,
   the body flow channel and the plunger flow channel in fluid communication when the plunger is in the retracted position, and fluid communication between the plunger flow channel and the body flow channel inhibited when the plunger is in the advanced position.

28. The retaining pin of claim 27 further comprising a body bore extending through the body, and wherein at least a portion of the plunger is received within the body bore when the plunger is in the advanced and retracted positions.

29. The retaining pin of claim 28, wherein the body flow channel comprises a portion of the body bore extending from a proximal opening in the body to the plunger, the proximal opening for fluid communication with the suction source.

30. A method of retaining a preform on a transfer shell of an injection molding machine, the preform having a preform open end and a preform closed end opposite the preform open end, the method comprising:
   a) drawing together the preform and a retaining pin mounted to the transfer shell to position a plunger of the pin in an interior space of the preform, and to retract the plunger relative to a body of the pin and open fluid communication between a proximal opening in the body and a distal opening in the plunger; and
   b) evacuating fluid from the interior space of the preform through an internal flow channel extending between the proximal and distal openings to maintain a vacuum force on the preform and retain the preform on the pin.

31. The method of claim 30, wherein step (b) further comprises drawing a flow of fluid into the interior space of the preform through a base flowgate between an outer surface of the body and a neck region inner surface of the preform, the flow of fluid convectively cooling the preform.

32. The method of claim 30, wherein step (a) further comprises engaging a preform inner surface of the preform closed end with a plunger abutment surface of the plunger to retract the plunger relative to the body.

* * * * *